(12) United States Patent
Takaoka

(10) Patent No.: US 9,167,384 B2
(45) Date of Patent: Oct. 20, 2015

(54) INFORMATION PROCESSING APPARATUS, INFORMATION PROCESSING METHOD, AND RECORDING MEDIUM

(71) Applicant: SONY CORPORATION, Tokyo (JP)

(72) Inventor: Tomohisa Takaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 101 days.

(21) Appl. No.: 13/847,097

(22) Filed: Mar. 19, 2013

(65) Prior Publication Data

US 2013/0310082 A1    Nov. 21, 2013

(30) Foreign Application Priority Data

May 21, 2012 (JP) ................................. 2012-115615

(51) Int. Cl.
*H04W 24/00* (2009.01)
*H04M 3/42* (2006.01)
*H04W 4/02* (2009.01)
*H04M 1/2745* (2006.01)

(52) U.S. Cl.
CPC ............ *H04W 4/023* (2013.01); *H04M 1/2745* (2013.01)

(58) Field of Classification Search
CPC .... H04M 1/2745; H04M 3/4931; H04W 4/02

USPC ............................................... 455/414.1, 418
See application file for complete search history.

(56) References Cited

U.S. PATENT DOCUMENTS

| | | | |
|---|---|---|---|
| 2006/0063548 A1* | 3/2006 | Kim | 455/518 |
| 2006/0240774 A1* | 10/2006 | Blom et al. | 455/41.1 |
| 2007/0281689 A1* | 12/2007 | Altman et al. | 455/435.1 |
| 2008/0133580 A1* | 6/2008 | Wanless et al. | 707/102 |
| 2010/0184419 A1* | 7/2010 | Othmer | 455/418 |
| 2010/0311395 A1* | 12/2010 | Zheng et al. | 455/414.1 |
| 2010/0330972 A1* | 12/2010 | Angiolillo | 455/418 |

FOREIGN PATENT DOCUMENTS

JP    2003-233564    8/2003

* cited by examiner

*Primary Examiner* — William Nealon
(74) *Attorney, Agent, or Firm* — Paratus Law Group, PLLC

(57) ABSTRACT

There is provided an information processing apparatus including a positional relationship information acquirer that acquires information indicating a position relationship between a first user and a second user, a nearness determiner that determines whether or not the first user and the second user are near each other, on the basis of the information indicating the position relationship, and a contact manager that sorts, on the basis of a result of the determination, a contact list which is provided to the first user and which includes contact information for the second user.

20 Claims, 11 Drawing Sheets

INFORMATION PROCESSING APPARATUS, INFORMATION PROCESSING METHOD, AND RECORDING MEDIUM

BACKGROUND

The present disclosure relates to an information processing apparatus, an information processing method, and a recording medium.

Communication technology advances with the times, and new communication technologies using network communication, such as email and chat, have emerged in addition to the telephone. As a result, the concept of contact information is no longer limited to phone numbers, and now encompasses information such as email addresses and network addresses. Such new communication technologies are utilized on an information processing device such as a personal computer (PC), for example. Meanwhile, telephones have also come to incorporate comparatively advanced information processing functionality, as with smartphones, for example.

In these circumstances, various proposals have been made for technologies that utilize the information processing functionality of a device used for communication to automatically sort a contact list, and make using communication technology more convenient for the user. For example, Japanese Unexamined Patent Application Publication No. 2003-233564 describes a technology that rates the closeness between a user and other users according to the number of times the user communicates with the other uses, and sorts a contact list in order of the other users with the highest rated closeness.

SUMMARY

Meanwhile, in recent years, communication devices such as telephones have acquired not only information processing functionality as discussed above, but also portability. For example, telephones have gone from landline (fixed) phones to mobile phones. Likewise, laptop and tablet form factors make information processing devices such as PCs easily portable. For this reason, it is becoming typical for the position of a terminal device to change with the position of the user who uses that device.

However, technology utilizing the portability of such terminal devices for contact sorting, for example, has not yet been sufficiently proposed. Thus, the present disclosure proposes a new and improved information processing apparatus, information processing method, and recording medium making it possible to utilize the portability of a terminal device to provide a contact list that is more easily usable by the user.

According to an embodiment of the present disclosure, there is provided an information processing apparatus including a positional relationship information acquirer that acquires information indicating a position relationship between a first user and a second user, a nearness determiner that determines whether or not the first user and the second user are near each other, on the basis of the information indicating the position relationship, and a contact manager that sorts, on the basis of a result of the determination, a contact list which is provided to the first user and which includes contact information for the second user.

Further, according to an embodiment of the present disclosure, there is provided an information processing method including acquiring information indicating a position relationship between a first user and a second user, determining whether or not the first user and the second user are near each other, on the basis of the information indicating the position relationship, and sorting, on the basis of a result of the determination, a contact list which is provided to the first user and which includes contact information for the second user.

Further, according to an embodiment of the present disclosure, there is provided a computer-readable recording medium having a program recorded thereon, the program causing a computer to execute the functions of acquiring information indicating a position relationship between a first user and a second user, determining whether or not the first user and the second user are near each other, on the basis of the information indicating the position relationship, and sorting, on the basis of a result of the determination, a contact list which is provided to the first user and which includes contact information for the second user.

If the portability of terminal devices used for contact between users is taken into account, the relationship between the position of the user (first user) and the position of another user (second user) is expected to greatly affect the user's motivation when attempting to contact another user. Consequently, if it is determined whether or not other users are nearby on the basis of the position relationship between the user and other users, and the contact list is sorted on the basis of these results, it is possible to provide an easier-to-use contact list, such as one that displays other users that the user wants to contact higher on the list, for example.

According to an embodiment of the present disclosure as described above, by utilizing the portability of a terminal device, it is possible to provide a contact list that is more easily usable by the user.

DETAILED DESCRIPTION OF THE EMBODIMENT(S)

Hereinafter, preferred embodiments of the present disclosure will be described in detail with reference to the appended drawings. Note that, in this specification and the appended Hereinafter, the description will proceed in the following order.

1. First Embodiment

Example of Acquiring Position Information from Server and Managing Contacts on Terminal Device
1-1. Example Process
1-2. Functional Configuration

2. Second Embodiment

Example of Acquiring Position Information from Server and Managing Contacts on Server
2-1. Example Process

3. Third Embodiment

Example of Acquiring Position Information by Machine-To-Machine Communication and Managing Contacts on Terminal Device
3-1. Example Process
3-2. Functional Configuration

4. Fourth Embodiment

Example of Acquiring Position Information by Machine-To-Machine Communication and Managing Contacts on Server
4-1. Example Process
5. Contact Sorting Examples
5-1. Grouping by time periods when users are together
5-2. Grouping by places where users are together
5-3. Other Examples
6. Hardware Configuration
7. Supplemental Remarks

1. First Embodiment

Example of Acquiring Position Information from Server and Managing Contacts on Terminal Device First, the first embodiment of the present disclosure will be described with reference to FIGS. 1 to 3. In this embodiment, position information used to sort a contact list is acquired from a server. Recently, social network services (SNS) have been providing services that share position information in real-time among mutually consenting friends. If position information for the user and other users is acquired from a server using such a service, for example, it is possible to identify other users near the user, or in other words together with the user.

(1-1. Example Process)

Figure 1:
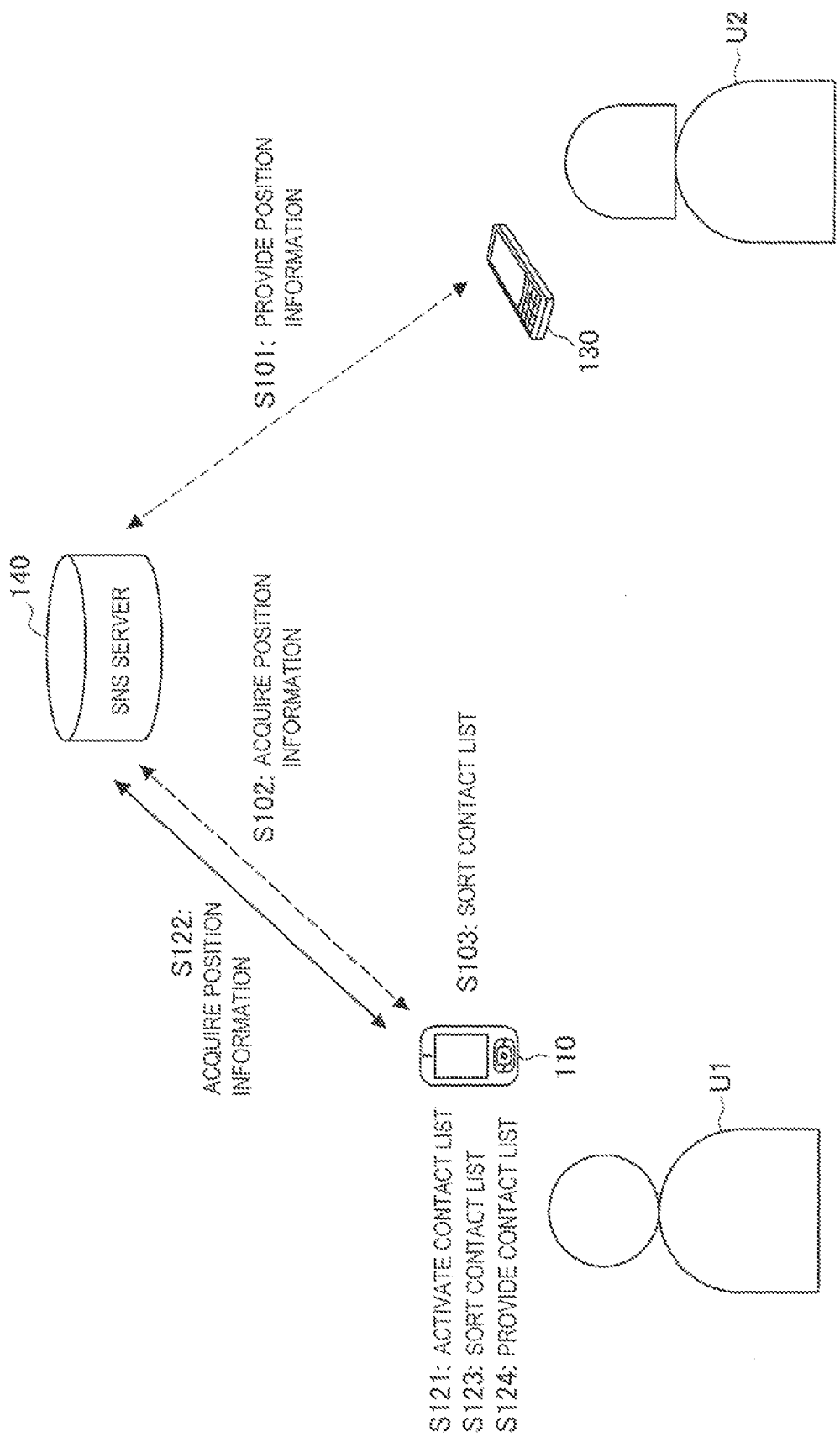
FIG. 1 is a figure that diagrammatically illustrates a process according to a first embodiment of the present disclosure.

FIG. 1 is a figure that diagrammatically illustrates a process according to the first embodiment of the present disclosure. In the example illustrated in FIG. 1, a user U1 carries a terminal device 110. In addition, a user U2 carries a terminal device 130. The user U1 and the user U2 use an SNS provided by an SNS server 140.

Note that information regarding the user U2 that is acquired via SNS may not necessarily be automatically associated with information regarding the user U2 that is displayed in a contact list on the terminal device 110. In the example illustrated in FIG. 1, it is assumed that the user U1 has already associated such information together.

The terminal device 110 may be a mobile phone (smartphone), or a device such as a tablet or laptop PC, for example. Note that the terminal device 110 is not limited to the above examples, and may be any device which is carried by the user U1 and which includes functionality for communicating with the SNS server 140, functionality for acquiring position information regarding the device itself, and functionality for managing a contact list presented to the user U1.

The terminal device 130 likewise may be a mobile phone (smartphone), or a device such as a tablet or laptop PC, for example. Note that the terminal device 130 is not limited to the above examples, and may be any device which is carried by the user U2 and which includes functionality for communicating with the SNS server 140 and functionality for acquiring position information regarding the device itself.

The SNS server 140 provides an SNS to the terminal device 110 and the terminal device 130 via a network. The SNS server 140 may be a single device on the network, but may also be functionality provided by the coordinated operation of multiple devices.

Detailed functional configurations of these respective devices will be discussed later.

(Periodic Process)

A first process in this embodiment involves the terminal device 110 periodically acquiring position information regarding the user U2 from the SNS server 140, and sorting a contact list on the basis of the acquired position information. The sorting of the contact list executed at this point may involve sorting the contact list according to the time during which the user U2 was near the user U1, or in other words, when and how long the user U1 and the user U2 were together.

In the example illustrated in FIG. 1, first, the terminal device 130 carried by the user U2 transmits position information regarding the user U2 to the SNS server 140 (step S101). The terminal device 130 may transmit position information periodically, or at arbitrary timings in accordance with operations by the user U2, for example.

Meanwhile, the terminal device 110 carried by the user U1 accesses the SNS server 140 and acquires position information regarding the user U2 (step S102). The terminal device 110 may acquire position information periodically, or at arbitrary timings in accordance with operations by the user U1, for example.

Note that in the example illustrated in FIG. 1, the user U1 and the user U2 exist in a friend relationship on the social network, and the user U2 has previously consented to share his or her own position information with the user U1. Provided that the above consent has been granted, the SNS server 140 provides the terminal device 110 with position information regarding the user U2 that was transmitted from the terminal device 130 and stored in the SNS server 140.

The position information regarding the user U2 that is provided to the terminal device 110 in the above step S102 may also be a history of position information regarding the user U2 that was provided by the terminal device 130 over a given period, such as the period after the terminal device 110 last accessed the SNS server 140, for example. This is because the terminal device 110 may, for example, estimate the time when the user U1 and the user U2 were together by chronologically processing the acquired position information regarding the user U2, and comparing the results to separately acquired position information regarding the user U1.

The terminal device 110, having acquired position information regarding the user U2, sorts the contact list on the basis thereof (step S103), and presents the sorted contact list to the user U1. As discussed earlier, the sorting of the contact list executed at this point may be a sort based on when and how long the user U1 and the user U2 were together. For example, in the case where the user U1 and the user U2 are together for a longer time than with other users, it may be inferred that the user U2 has a high degree of closeness to the user U1, and the user U2 may rise to a higher place on the contact list. The user U2 may also be categorized into a group based on a time when the user U2 was together with the user U1 or a place where the user U2 was together with the user U1, and the categorization of the user U2 into a group may be added or corrected according to the sorting of the contact list.

(Process when Activating Contact List)

A second process in this embodiment is executed when the user U1 issues instructions for activating the contact list, and involves the terminal device 110 acquiring position information regarding the user U2 from the SNS server 140, sorting the contact list on the basis of the acquired position information, and then presenting the sorted contact list to the user U1. The sorting of the contact list executed at this point may involve sorting the contact list according to whether or not the user U2 is near the user U1 currently, or in other words at the time when the contact list is activated.

In the example illustrated in FIG. 1, first, the terminal device 110 activates the contact list according to instructions from the user U1 (step S121). The activation of the contact list at this point may involve activating application software for presenting a contact list, for example.

Next, the terminal device 110 accesses the SNS server 140 and acquires position information regarding the user U2 (step S122). Similarly to the case of the periodic process above, the SNS server 140 provides the terminal device 110 with position information regarding the user U2, assuming that the user U2 has given consent.

The position information regarding the user U2 that is provided to the terminal device 110 in the above step S122 may also be the most recent position information regarding the user U2 at the present time, for example. Alternatively, in the case of a request for position information regarding the user U2 from the terminal device 110, the SNS server 140 may access the terminal device 130, acquire current position information regarding the user U2, and provide the newly acquired position information to the terminal device 110. This is because the terminal device 110 may, for example, infer whether or not the user U1 and the user U2 are near each other by comparing acquired position information regarding the user U2 to current position information regarding the user U1.

The terminal device 110, having acquired position information regarding the user U2, sorts the contact list on the basis thereof (step S123), and presents the sorted contact list to the user U1 (step S124). As discussed earlier, the sorting of the contact list executed at this point may be a sort based on whether or not the user U1 and the user U2 are currently near each other. For example, in the case where the user U2 is near the user U1 and it is determined that the users U1 and U2 are together, it may be inferred that since the user U2 is currently together with the user U1, there is little need to use communication technology to contact the user U2, and thus the user U2 may fall to a lower place in the contact list. However, in the case where the user U2 is near the user U1 but it is not determined that the users U1 and U2 are together, it may be inferred that the user U2 has unintentionally come near the user U1, and in the case where it is determined that the user U1 may possibly contact the user U2 for some other reason, the user U2 may rise to a higher place on the contact list.

Note that although the process of sorting the contact list is separated into a periodic process and a process executed when activating the contact list in the above example, these processes may also be integrated. For example, when the contact list is activated, a history of position information regarding the user U2 since the last activation of the contact list may be acquired, and the contact list may be sorted on the basis of the time when the user U1 and the user U2 were together. Having done the above, the contact list may then be sorted again on the basis of whether or not the user U1 and the user U2 are currently near each other.

Additionally, the SNS server 140 rather than the terminal device 110 may determine whether or not the user U1 and the user U2 are near each other. In this case, the terminal device 110 provides its own position information to the SNS server 140 as position information regarding the user U1. The SNS server 140 determines whether or not the user U1 and the user U2 are near each other on the basis of respective position information regarding the user U1 and the user U2, and provides the determination result to the terminal device 110.

(1-2. Functional Configuration)

Figure 2:
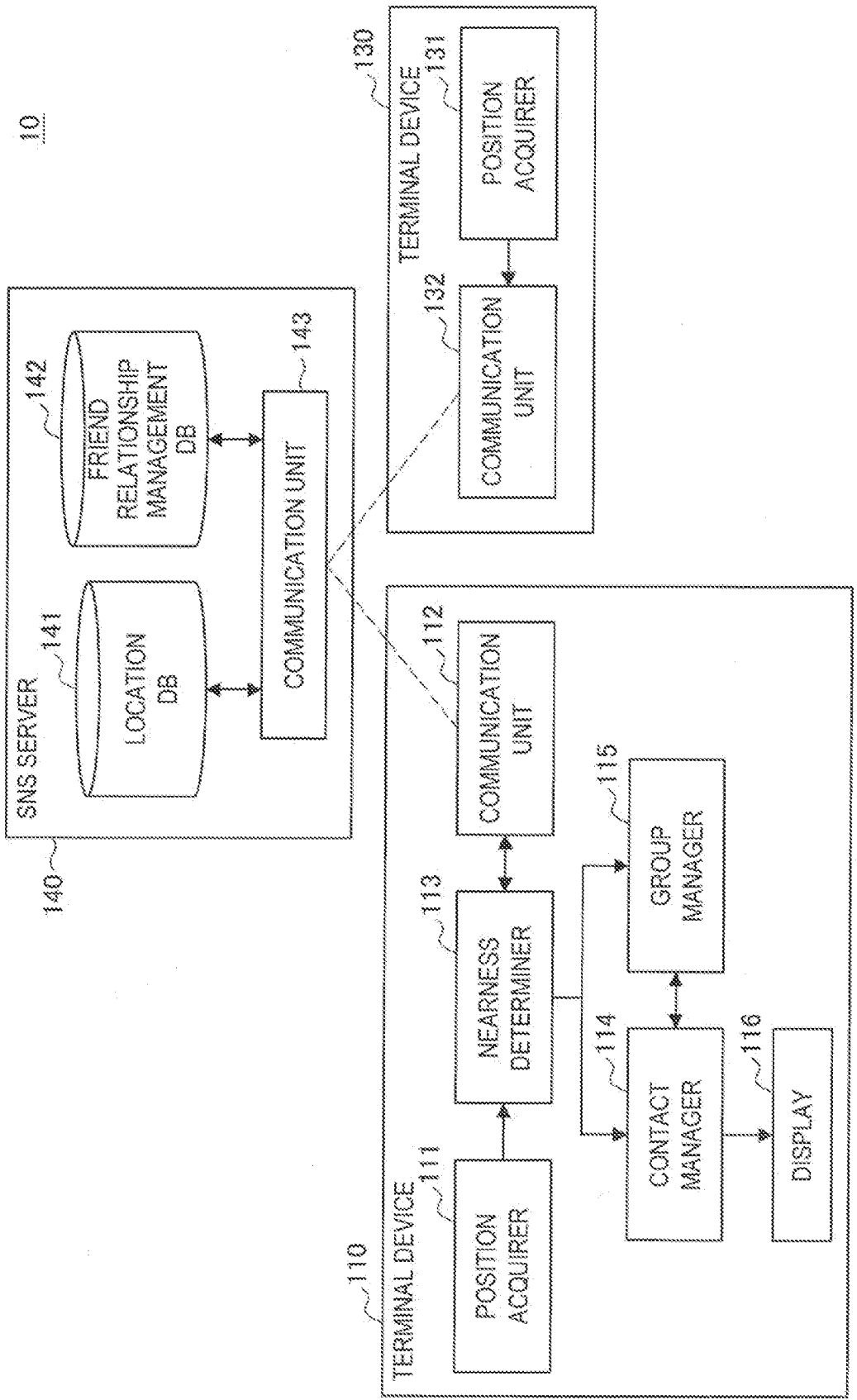
FIG. 2 is a block diagram schematically illustrating a functional configuration of a system according to the first embodiment of the present disclosure.

FIG. 2 is a block diagram schematically illustrating a functional configuration of a system according to the first embodiment of the present disclosure.

A system 10 according to this embodiment includes a terminal device 110, a terminal device 130, and an SNS server 140.

(Terminal Device Used by the User)

The terminal device 110 used by the user includes a position acquirer 111, a communication unit 112, a nearness determiner 113, a contact manager 114, a group manager 115, and a display 116. Note that this functional configuration may be realized using the hardware configuration of an information processing apparatus like that discussed later, for example.

The position acquirer 111 computes position information indicating the current position of the user U1 and time information indicating the current time on the basis of positioning information (a GPS signal, for example) received from positioning technology such as Global Positioning System (GPS) satellites, for example, and outputs the results to the nearness determiner 113 as position/time information. Alternatively, the position acquirer 111 may acquire the above position information and time information by positioning using a Wireless Fidelity (Wi-Fi®) access point, or by positioning using a mobile base station.

The communication unit 112 communicates with the SNS server 140 using various wired or wireless communication formats. The communication unit 112 transmits a request for position information regarding the user U2 to the SNS server 140, and receives position information regarding the user U2 provided in response to the request, for example. The communication unit 112 outputs received position information regarding the user U2 to the nearness determiner 113. The position information regarding the user U2 received at this point may be position/time information with added time information regarding the time of acquisition, similar to the position information regarding the user U1 acquired by the above position acquirer 111. In this way, in this embodiment, the position acquirer 111 and the communication unit 112 acquire information indicating the positional relationship between the user U1 and the user U2.

The nearness determiner 113 determines whether or not the user U1 and the user U2 are near each other, on the basis of the respective position information regarding the user U1 and the user U2 provided by the position acquirer 111 and the communication unit 112. The nearness determiner 113 may also determine whether or not the user U1 and the user U2 are near each other at a given time, for example. The given time may be the time when the contact list is activated, for example. In this case, the nearness determiner 113 may also determine whether or not the user U1 and the user U2 are currently near each other, on the basis of the most recent position information regarding the user U1 and the user U2.

The nearness determiner 113 may also periodically determine whether or not the user U1 and the user U2 are near each other. In this case, the nearness determiner 113 is able to accumulate determination results, and from them identify periods of time during which the user U1 and the user U2 were near each other. For example, the nearness determiner 113 may chronologically associate position information histories regarding the user U1 and the user U2, and determine whether or not the user U1 and the user U2 were near each other during respective periods of time. Alternatively, the nearness determiner 113 may also repeat nearness determinations based on the latest position information regarding the user U1 and the user U2.

Note that the nearness determiner 113 may make a binary determination of whether or not the user U1 and the user U2 are near each other, but may also make a multi-valued determination. In the former case, the nearness determiner 113 may determine that the user U1 and the user U2 are near each other and together in the case where the distance between the positions indicated by their respective position information is less than a given threshold, for example. In the latter case, the nearness determiner 113 may infer that the user U1 and the user U2 are near each other but not together in the case where the distance between the positions indicated by their respective position information is less than a first threshold, and determine that the user U1 and the user U2 are near each other and together in the case where the above distance is less than a second threshold, for example. Such a multi-valued determination may be utilized to identify cases where, for example, users contact each other infrequently but are coincidentally nearby, as discussed later.

The contact manager 114 manages the contact list presented to the user U1 on the terminal device 110. The contact list is a list recording contact information in association with users. In this embodiment, the contact list is data stored in storage of the terminal device 110, for example. Contact information is information used when communicating with a particular user by given communication technology, and may include phone numbers, email address, and network addresses, for example. The contact manager 114 presents the contact list to the user U1 via the display 116. At this point, the contact list is displayed arranged in a given order. The contact manager 114 sorts the contact list according to determination results from the nearness determiner 113, modifying the order in which the contact list is displayed.

The group manager 115 manages groups set in the contact list managed by the contact manager 114. A group may be, for example, a category of users according to a time or place spent together with the user U1, as discussed later. The group manager 115 updates the categorization of particular users into such groups according to determination results from the nearness determiner 113. In addition, the groups may include groups generated by settings specified by the user U1, as well as groups imported from the SNS provided by the SNS server 140.

As discussed above, the display 116 is used to present the contact list to the user U1. The display 116 displays the contact list as a user interface (UI), and may also acquire operations performed by the user U1 using a separately provided touch panel or other component, whereby the user U1 initiates communication with a user selected from among the other users displayed on the contact list.

(Terminal Device Used by Other User)

The terminal device 130 used by the other user includes a position acquirer 131 and a communication unit 132. Note that this functional configuration may be realized using the hardware configuration of an information processing apparatus like that discussed later, for example.

The position acquirer 131 acquires position information regarding the user U2, similarly to the position acquirer 111 discussed earlier. Position information regarding the user U2 may also be position/time information with associated time information.

The communication unit 132 communicates with the SNS server 140 using various wired or wireless communication formats. The communication unit 132 transmits position information regarding the user U2 to the SNS server 140, for example. Additionally, the communication unit 132 may also receive a request for position information regarding the user U2 from the SNS server 140, and transmit position information regarding the user U2 to the SNS server 140 in response to the request.

(SNS Server)

The SNS server 140 includes a location database (DB) 141, a friend relationship management DB 142, and a communication unit 143. Note that this functional configuration may be realized using the hardware configuration of an information processing apparatus like that discussed later, for example. This functional configuration may be provided by a single device on a network, but may also be provided by the coordinated operation of multiple devices.

The location DB 141 stores a location table storing position information and time information indicated by position/time information transmitted from the terminal devices carried by users belonging to the SNS. The location table may include information indicating users' SNS, their accounts, and their times and positions, for example. Position information regarding the user U2 that is received from the terminal device 130 is stored in this location DB 141.

The friend relationship management DB 142 stores a friend relationship management table that includes various information regarding users participating in the SNS. The friend relationship management table is a table for managing the users participating in an SNS by their accounts, and stores information indicating people, devices, their SNS, their groups, and friends in association with accounts. When providing position information regarding the user U2 to the user U1, the SNS server 140 may reference the friend relationship management DB 142 to confirm the friend relationship between the user U1 and the user U2, and to confirm that the user U2 has consented to share his or her position information with the user U1.

The communication unit 143 communicates with the terminal device 110 and the terminal device 130 using various wired or wireless communication formats. The communication unit 143 receives position information regarding the user U2 from the terminal device 130, for example. The communication unit 143 may also receive a request for position information regarding the user U2 from the terminal device 110, and transmit position information regarding the user U2 to the terminal device 110 in response to the request. Additionally, the communication unit 143 may also transmit a request for position information regarding the user U2 to the terminal device 130, and receive position information regarding the user U2 provided in response to the request.

In the first embodiment of the present disclosure described above, an SNS that provides a position information sharing service is utilized to acquire position information regarding another user. In this way, if it is possible to utilize a position information sharing service provided by an SNS, the user is able to easily acquire comparatively precise position information regarding other users, which is then applied to how the user's contact list is sorted.

2. Second Embodiment

Example of Acquiring Position Information from Server and Managing Contacts on Server Next, the second embodiment of the present disclosure will be described with reference to FIG. 3. In this embodiment, position information used to sort a contact list is acquired from a server, similarly to the first embodiment above. However, in this embodiment, it is the server that stores the contact list, rather than the terminal device used by the user.

(2-1. Example Process)

Figure 3:
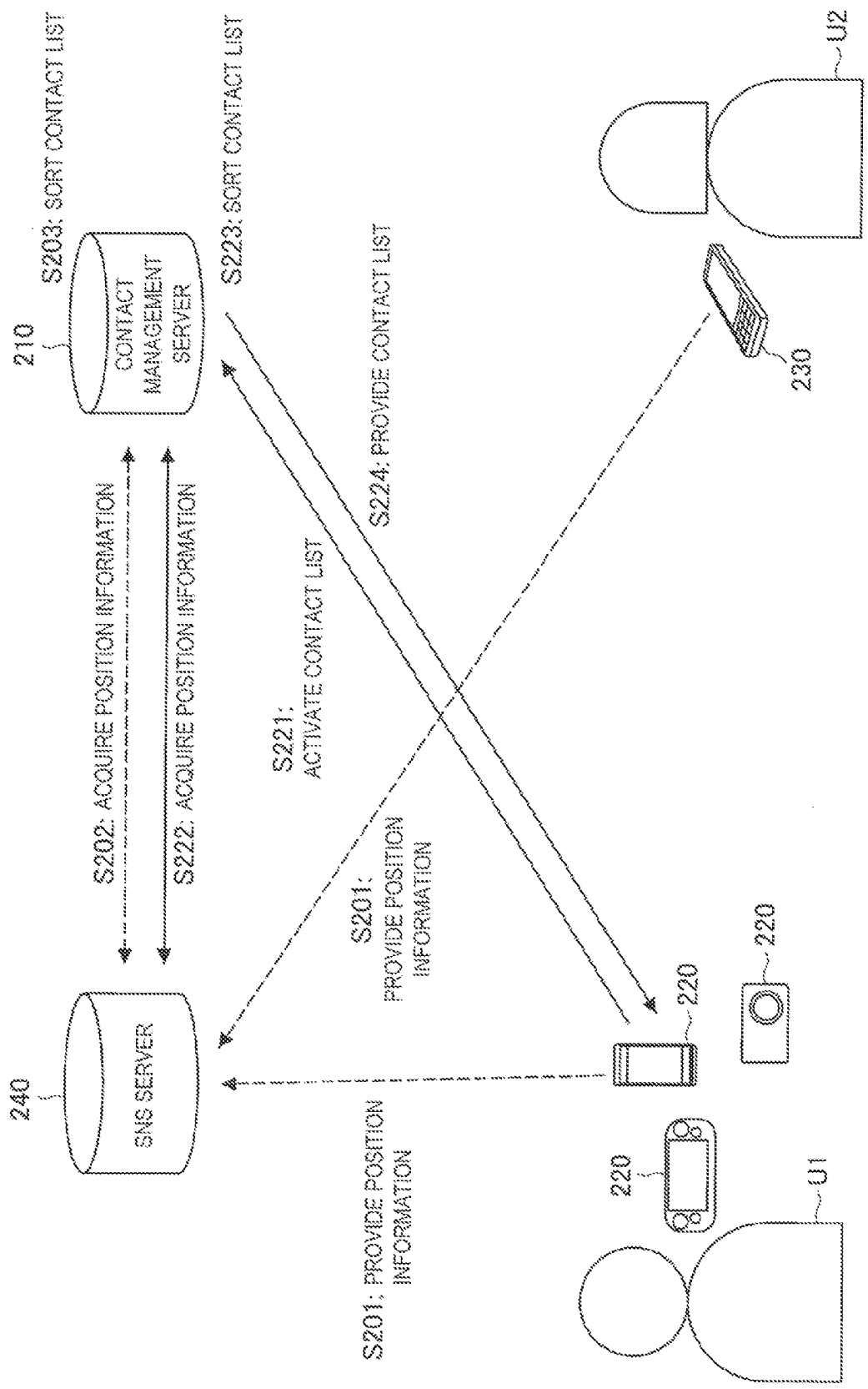
FIG. 3 is a figure that diagrammatically illustrates a process according to a second embodiment of the present disclosure.

FIG. 3 is a figure that diagrammatically illustrates a process according to the second embodiment of the present disclosure. In the example illustrated in FIG. 3, a user U1 carries multiple terminal devices 220. In addition, a user U2 carries a terminal device 230. The user U1 and the user U2 use an SNS provided by an SNS server 240. Also, the user U1 manages a contact list using a service provided by a contact management server 210.

Note that information regarding the user U2 that is acquired via SNS may not necessarily be automatically associated with information regarding the user U2 that is displayed in a contact list on the contact management server 210. In the example illustrated in FIG. 3, it is assumed that the user U1 has already associated such information together.

The terminal devices 220 may have a similar configuration as the terminal device 110 in the foregoing first embodiment. However, the terminal devices 220 do not include functionality equivalent to the nearness determiner 113, the contact manager 114, and the group manager 115. These functions are realized by the contact management server 210.

The terminal device 230 may have a similar configuration as the terminal device 130 in the foregoing first embodiment.

The SNS server 240 may have a similar configuration as the SNS server 140 in the foregoing first embodiment. However, the SNS server 240 provides position information regarding the user U2 to the contact management server 210 rather than the terminal devices 220. The SNS server 240 also acquires position information regarding the user U1 from the terminal devices 220, and provides the acquired information to the contact management server 210.

The contact management server 210 provides a contact list management service to the terminal devices 220 via a network. The contact management server 210 provides contact list information in response to a request from any of the multiple terminal devices 220. The contact management server 210 acquires position information regarding the user U1 and the user U2 from the SNS server 240, and sorts the user U1's contact list on the basis thereof. For this reason, the contact management server 210 includes functionality equivalent to the nearness determiner 113, the contact manager 114, and the group manager 115 of the terminal device 110 in the foregoing first embodiment.

By utilizing a contact list management service provided by the contact management server 210, it is possible to refer to the same contact list on any of the terminal devices 220, even in cases where the user U1 uses multiple terminal devices 220 for different purposes, for example. The service provided by the contact management server 210 may also be an SNS. Additionally, the service provided by the contact management server 210 may also be part of the SNS provided by the SNS server 240. In this case, the contact management server 210 and the SNS server 240 may be integrated.

(Periodic Process)

A first process in this embodiment involves the contact management server 210 periodically acquiring position information regarding the user U1 and the user U2 from the SNS server 240, and sorting a contact list on the basis of the acquired position information. The sorting of the contact list executed at this point may involve sorting the contact list according to the time during which the user U2 was near the user U1, or in other words, when and how long the user U1 and the user U2 were together.

In the example illustrated in FIG. 3, first, the terminal devices 220 carried by the user U1 and the terminal device 230 carried by the user U2 transmit position information regarding their respective users to the SNS server 240 (step S201). The respective terminal devices may transmit position information periodically, or at arbitrary timings in accordance with operations by their respective users, for example. Position information from the multiple terminal devices 220 may be transmitted by any of the devices being carried by the user U1 at that time.

Meanwhile, the contact management server 210 accesses the SNS server 240 and acquires position information regarding the user U1 and the user U2 (step S202). The contact management server 210 may acquire position information periodically, or at arbitrary timings in accordance with instructions from the user U1 transmitted from the terminal devices 220, for example.

Note that in the example illustrated in FIG. 3, the user U1 and the user U2 exist in a friend relationship on the social network, and the user U2 has previously consented to share his or her own position information with the user U1. Provided that the above consent has been granted, the SNS server 240 provides the contact management server 210 with position information regarding the user U2 that was transmitted from the terminal device 230 and stored in the SNS server 240.

Also, in the example illustrated in FIG. 3, the position information acquisition request to the SNS server 240 is transmitted from the contact management server 210 and not the terminal devices 220. Consequently, the SNS server 240 is able to recognize an association made in advance between the user U1's account on the SNS, and the user U1's account on the contact management server 210. This association may be made as a result of the user U1 using a terminal device 220 to access the SNS server 240 and set up account information, for example. This association may also be made automatically if the service provided by the contact management server 210 is part of the SNS provided by the SNS server 240.

The position information regarding the user U1 and the user U2 that is provided to the contact management server 210 in the above step S202 may also be histories of position information regarding the user U1 and the user U2 that are provided by the terminal devices 220 and the terminal device 230 over a given period, such as the period after the contact management server 210 last accessed the SNS server 240, for example. This is because the contact management server 210 may, for example, estimate the time when the user U1 and the user U2 were together by chronologically comparing the acquired position information regarding the user U1 and the user U2.

The contact management server 210, having acquired position information regarding the user U1 and the user U2, sorts the contact list on the basis thereof (step S203). As discussed earlier, the sorting of the contact list executed at this point may be a sort based on when and how long the user U1 and the user U2 were together. Since specific examples of sorting are similar to those described in the foregoing first embodiment, their description is omitted herein.

(Process when Activating Contact List)

A second process in this embodiment is executed when the user U1 issues instructions for activating the contact list via a terminal device 220, and involves the contact management server 210 acquiring position information regarding the user U1 and the user U2 from the SNS server 240, sorting the contact list on the basis of the acquired position information, and then transmitting the sorted contact list to the terminal devices 220, at which point the terminal devices 220 present to the user U1. The sorting of the contact list executed at this point may involve sorting the contact list according to whether or not the user U2 is near the user U1 currently, or in other words at the time when the contact list is activated.

In the example illustrated in FIG. 3, first, a terminal device 220 issues a request to the contact management server 210 for activating the contact list according to instructions from the user U1 (step S221). The activation of the contact list at this point may involve activating application software for presenting a contact list on a terminal device 220, with the application software requesting contact list data from the contact management server 210.

Next, the contact management server 210 accesses the SNS server 240 and acquires position information regarding the user U1 and the user U2 (step S222). Similarly to the case of the periodic process above, the SNS server 240 provides the contact management server 210 with position information regarding the user U1 and the user U2, assuming that the user U2 has given consent.

The position information regarding the user U1 and the user U2 that is provided to the contact management server 210 in the above step S222 may also be the most recent position information regarding the user U1 and the user U2 at the present time, for example. Alternatively, in the case of a request for position information regarding the user U1 and the user U2 from the contact management server 210, the SNS server 240 may respectively access the terminal devices 220 and the terminal device 230, acquire current position information regarding the user U1 and the user U2, and provide the newly acquired position information to the contact management server 210. This is because the contact management server 210 may, for example, infer whether or not the user U1 and the user U2 are near each other by comparing the current position information regarding the user U1 and the user U2.

The contact management server 210, having acquired position information regarding the user U1 and the user U2, sorts the contact list on the basis thereof (step S223), and transmits sorted contact list data to the terminal devices 220. In so doing, the contact list is presented to the user U1 on the terminal devices 220 (step S224). As discussed earlier, the sorting of the contact list executed at this point may be a sort based on whether or not the user U1 and the user U2 are currently near each other. Since specific examples of sorting are similar to those described in the foregoing first embodiment, their description is omitted herein.

Note that although position information regarding the user U1 is acquired from the SNS server 240 in the above example, the user U1 may also provide his or her own position information directly to the contact management server 210.

Also, although the process of sorting the contact list is separated into a periodic process and a process executed when activating the contact list in the above example and similarly to the example in the first embodiment, these processes may also be integrated.

According to the second embodiment of the present disclosure described above, the user is able to easily acquire comparatively precise position information regarding other users, which is then applied to how the user's contact list is sorted. Furthermore, by managing the contact list on a server, the user is able to utilize the contact list suitably managed on respective terminal devices, even in cases where the user uses multiple terminal devices for different purposes.

3. Third Embodiment

Example of Acquiring Position Information By Machine-To-Machine Communication and Managing Contacts on Terminal Device Next, the third embodiment of the present disclosure will be described with reference to FIGS. 4 and 5. In this embodiment, position information used to sort a contact list is acquired by machine-to-machine (M2M) communication. More specifically, position information indicating that the user and another user are near each other is acquired by successfully conducting short-range communication between the terminal device carried by the user and the terminal device carried by the other user. In this way, since position information is used in the present disclosure to determine whether or not users are near each other, such position information it not necessarily limited to coordinate-based information such as latitude and longitude information.

(3-1. Example Process)

Figure 4:
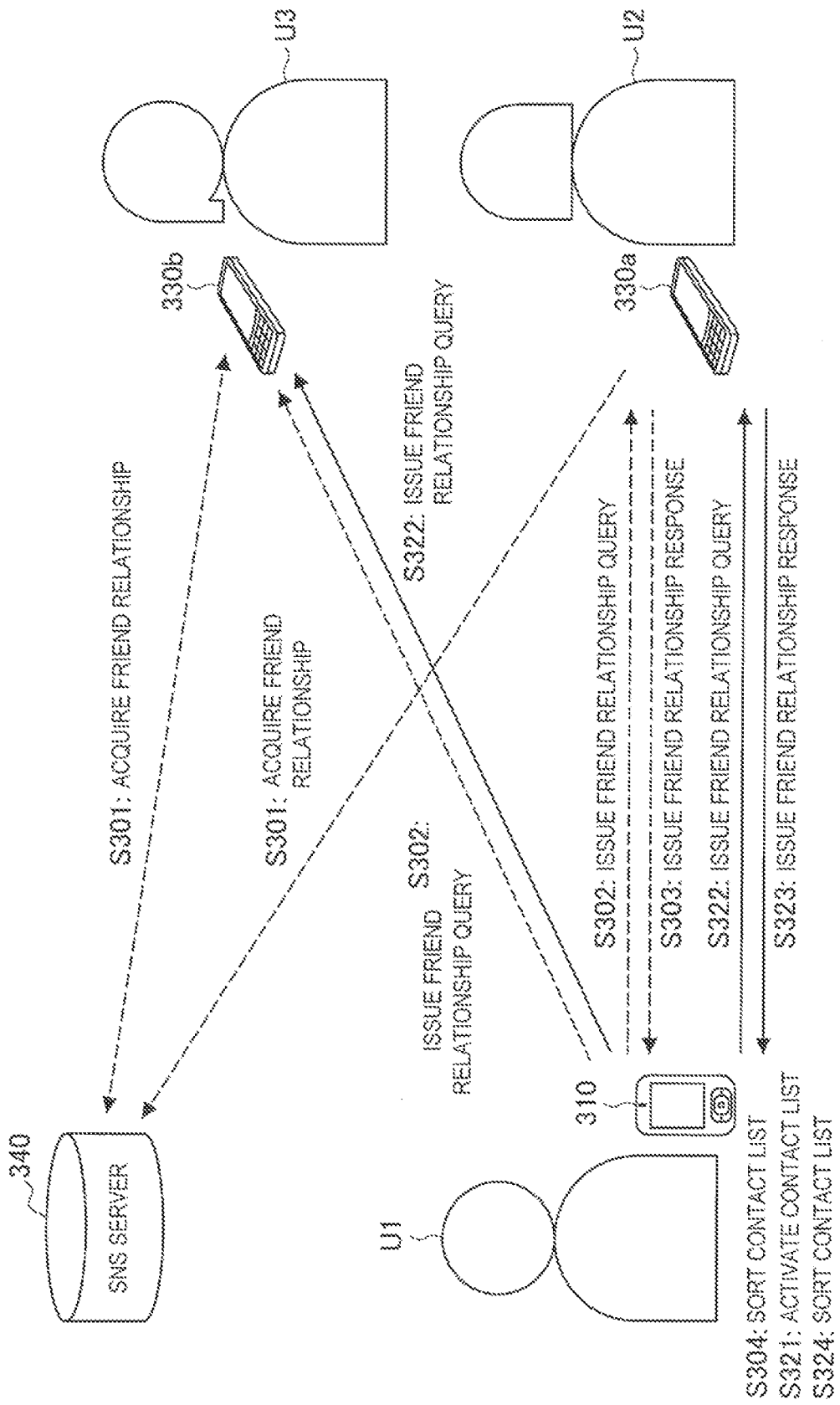
FIG. 4 is a figure that diagrammatically illustrates a process according to the third embodiment of the present disclosure.

FIG. 4 is a figure that diagrammatically illustrates a process according to the third embodiment of the present disclosure. In the example illustrated in FIG. 4, a user U1 carries a terminal device 310. In addition, a user U2 and a user U3 respectively carry a terminal device 330a and a terminal device 330b. The users U1 to U3 all use an SNS provided by an SNS server 340. Note that the user U1 and the user U2 exist in a friend relationship on the SNS, and the user U2 is included in the contact list of the terminal device 310. On the other hand, the user U1 and the user U3 do not have a friend relationship on the SNS. Alternatively, the user U3 is not using the SNS provided by the SNS server 340. However, the user U3 may or may not be included in the contact list of the terminal device 310.

The terminal device 310 may be a mobile phone (smartphone), or a device such as a tablet or laptop PC, for example. Note that the terminal device 310 is not limited to the above examples, and may be any device which is carried by the user U1 and which includes functionality for executing short-range communication with the terminal devices 330a and 330b, and functionality for managing a contact list presented to the user U1.

The terminal devices 330a and 330b (hereinafter collectively designated the terminal devices 330 in some cases) likewise may be a mobile phone (smartphone), or a device such as a tablet or laptop PC, for example. Note that the terminal devices 330 are not limited to the above examples, and may be any device which is carried by the user U2 or the user U3 and which includes functionality for communicating with the SNS server 340 and functionality for executing short-range communication with the terminal device 310.

The SNS server 340 provides an SNS to the terminal devices 330 via a network. The SNS server 340 may be a single device on the network, but may also be functionality provided by the coordinated operation of multiple devices.

Detailed functional configurations of these respective devices will be discussed later.

(Periodic Process)

A first process in this embodiment involves the terminal device 310 periodically executing short-range communication with the terminal devices 330 positioned nearby, and using the results as position information to sort a contact list. The sorting of the contact list executed at this point may involve sorting the contact list according to the time during which the user U2 was near the user U1, or in other words, when and how long the user U1 and the user U2 were together.

In the example illustrated in FIG. 4, first, the terminal device 330a carried by the user U2 and the terminal device 330b carried by the user U3 respectively acquire information regarding friend relationships from the SNS server 340 (step S301). The respective terminal devices 330 may acquire information regarding friend relationships periodically, or at arbitrary timings in accordance with operations by the users U2 and U3, for example.

The information regarding friend relationships acquired in the above step S301 is saved as respective caches in the terminal devices 330. Since the user U1 and the user U2 exist in a friend relationship on the SNS as discussed earlier, information indicating the friend relationship with the user U1 is saved in the terminal device 330a. On the other hand, since the user U1 and the user U3 do not exist in a friend relationship on the SNS, information indicating a friend relationship with the user U1 is not saved in the terminal device 330b. Alternatively, if the user U3 is not using the SNS, the query itself to the SNS server 340 is not executed, and the information itself which indicates friend relationships on the SNS is not saved in the terminal device 330b.

Meanwhile, the terminal device 310 carried by the user U1 transmits a friend relationship query by short-range communication to the terminal devices 330 positioned nearby (step S302). This query is not directed at a specific terminal device 330, but is directed at unspecified terminal devices 330 positioned near the terminal device 310. With this query, the terminal device 310 is attempting to ascertain whether or not other users existing in a friend relationship with the user U1 on the SNS are near the user U1. Thus, the content of the query may contain information specifying the SNS and information specifying the user U1, for example. As an example, the query may contain information in the form of "SNS name+user U1's account name".

The terminal devices 330, having received the query from the terminal device 310 in the above step S302, transmit responses acknowledging the friend relationship to the terminal device 310 if the friend relationship between the respective users and the user U1 on the SNS is recognized (step S303). Since information regarding friend relationships on the SNS was already saved in the terminal devices 330 in the above step S301, by referencing this information it is possible to determine whether or not the respective users and the user U1 exist in a friend relationship. Alternatively, the terminal devices 330 may acquire information regarding friend relationships from the SNS server 340 upon receiving a query from the terminal device 310.

As discussed above, information indicating a friend relationship with the user U1 on the SNS is saved in the terminal device 330a but not in the terminal device 330b. Consequently, between these terminal devices 330, only the terminal device 330a transmits a response to the terminal device 310 in the above step S303. The response from the terminal device 330a at this point may contain information enabling the terminal device 310 to identify the user of the terminal device 330a, or in other words the user U2. For example, the response may contain information in the form of "(SNS name+) user U2's account name".

Upon receiving the response from the terminal device 330a, the terminal device 310 uses the content of the response as position information indicating that the position of the user U2 is near the position of the user U1, sorts the contact list on the basis of the position information (step S304), and presents the sorted contact list to the user U1. As discussed earlier, the sorting of the contact list executed at this point may be a sort based on when and how long the user U1 and the user U2 were together. Since specific examples of sorting are similar to those described in the foregoing first embodiment, detailed description thereof is omitted herein.

(Process when Activating Contact List)

A second process in this embodiment is executed when the user U1 issues instructions for activating the contact list, and involves the terminal device 310 executing short-range communication with the terminal devices 330 positioned nearby, using the results thereof as position information to sort a contact list, and then presenting the sorted contact list to the user U1. The sorting of the contact list executed at this point may involve sorting the contact list according to whether or not the user U2 is near the user U1 currently, or in other words at the time when the contact list is activated.

In the example illustrated in FIG. 4, first, the terminal device 310 activates the contact list according to instructions from the user U1 (step S321). The activation of the contact list at this point may involve activating application software for presenting a contact list, for example.

Next, the terminal device 310 transmits a friend relationship query to the terminal devices 330 positioned nearby (step S322). This query is not directed at a specific terminal device 330, but is directed at unspecified terminal devices 330 positioned near the terminal device 310. Similarly to the query in the above step S302, the content of the query may contain information identifying the SNS and information identifying the user U1, for example.

The terminal devices 330, having received the query from the terminal device 310 in the above step S322, transmit responses acknowledging the friend relationship to the terminal device 310 if the friend relationship between the respective users and the user U1 on the SNS is recognized (step S323). Since information regarding friend relationships on the SNS was already saved in the terminal devices 330 in the above step S301, by referencing this information it is possible to determine whether or not the respective users and the user U1 exist in a friend relationship. Alternatively, the terminal devices 330 may transmit a query to the SNS server 340 and acquire information regarding friend relationships after receiving a query from the terminal device 310.

As discussed above, information indicating a friend relationship with the user U1 on the SNS is saved in the terminal device 330a but not in the terminal device 330b. Consequently, between these terminal devices 330, only the terminal device 330a transmits a response to the terminal device 310 in the above step S323. Similarly to the response in the above step S303, the response from the terminal device 330a at this point may contain information enabling the terminal device 310 to identify the user of the terminal device 330a, or in other words the user U2.

Upon receiving the response from the terminal device 330a, the terminal device 310 acquires the content of the response as position information indicating that the position of the user U2 is near the position of the user U1, and sorts the contact list on the basis of the position information (step S324). As discussed earlier, the sorting of the contact list executed at this point may be a sort based on whether or not the user U1 and the user U2 are currently near each other.

Since specific examples of sorting are similar to those described in the foregoing first embodiment, their description is omitted herein.

(3-2. Functional Configuration)

Figure 5:
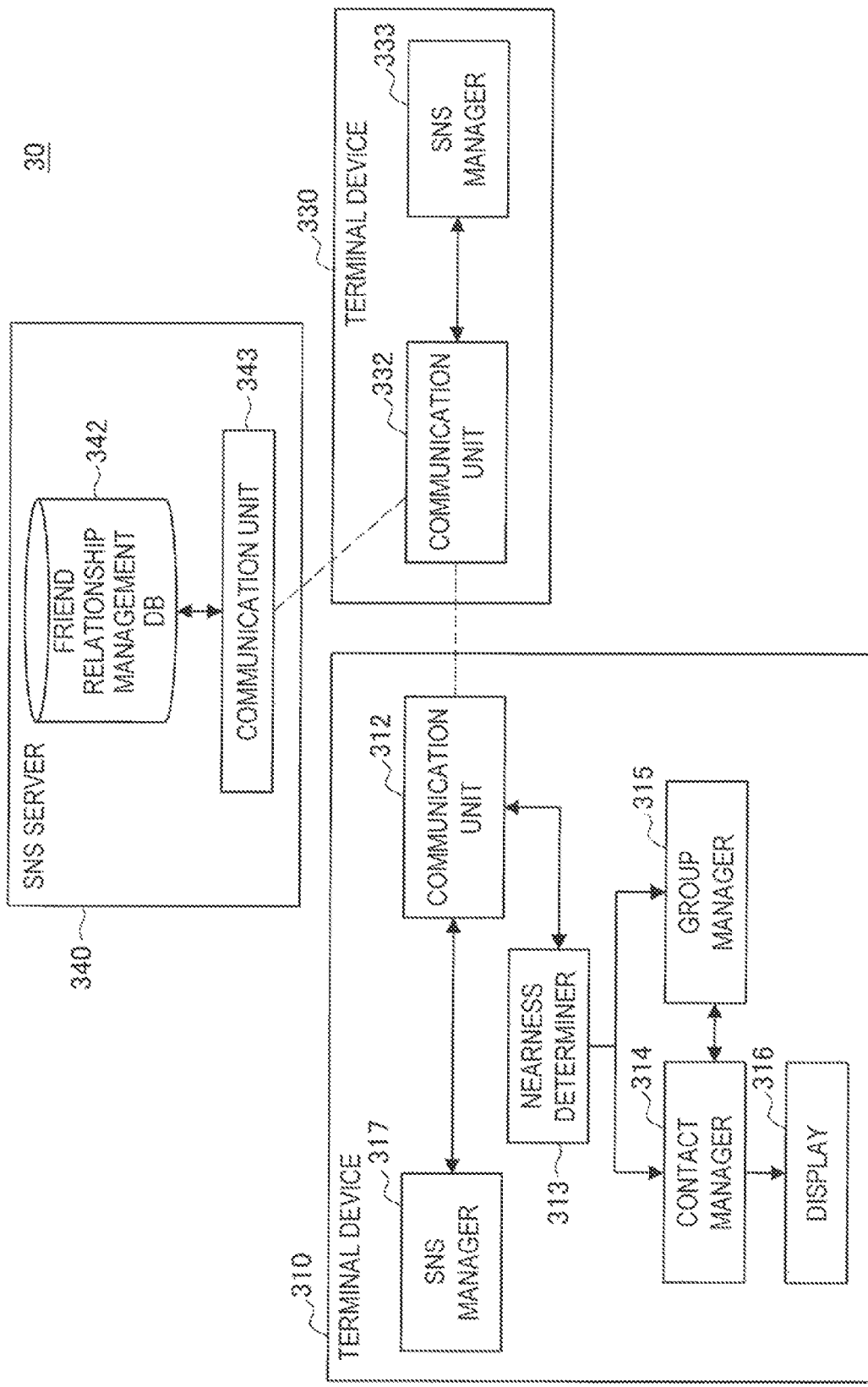
FIG. 5 is a block diagram schematically illustrating a functional configuration of a system according to the third embodiment of the present disclosure.

FIG. 5 is a block diagram schematically illustrating a functional configuration of a system according to the third embodiment of the present disclosure.

A system 30 according to this embodiment includes a terminal device 310, a terminal device 330, and an SNS server 340.

(Terminal Device Used by the User)

The terminal device 310 used by the user includes a communication unit 312, a nearness determiner 313, a contact manager 314, a group manager 315, a display 316, an SNS manager 317, and an encryption/decryption unit 318. This functional configuration may be realized using the hardware configuration of an information processing apparatus like that discussed later, for example.

The communication unit 312 communicates with the terminal devices 330 by short-range communication. The short-range communication is wireless communication executed in an ad hoc manner, for example, and may be a communication standard such as wireless local area network (WLAN), Bluetooth®, near field communication (NFC), or infrared communication. However, the short-range communication is not strictly limited to being ad hoc, and may also be communication other than wireless communication. For example, the short-range communication may be executed by using a wired LAN inside a home or workplace to search for terminal devices 330 connected to the same LAN as the terminal device 310. Note that in order to prevent spoofing and information leaks, it is desirable to protect the information transmitted and received by short-range communication by encrypting the information according to a suitable format, for example.

As discussed hereinafter, in the present embodiment, the results of short-range communication with the terminal devices 330 which are acquired by the communication unit 312 are used as information indicating the position relationship between the user and other users. In other words, the communication unit 312 in the present embodiment also functions as a "positional relationship information acquirer".

In the case where the communication unit 312 succeeds at short-range communication with a terminal device 330, the nearness determiner 313 determines that the user U1 carrying the terminal device 310 and the user carrying a terminal device 330 (the user U2, for example) are near each other. Successful short-range communication herein means that a response acknowledging the friend relationship is received from a terminal device 330 in response to a friend relationship query transmitted by the communication unit 312. From the information contained in the response, the nearness determiner 313 identifies the user (the user U2, for example) carrying the terminal device 330 that was successfully communicated with, and determines that the user U1 and the user U2 were near each other.

As described above, the nearness determiner 313 may also identify another user who is near the user U1 at a given time, for example. The given time may be the time when the contact list is activated, for example. In this case, the nearness determiner 313 may identify another user who is near the user U1 on the basis of the latest short-range communication results. In addition, the nearness determiner 313 may also continuously identify other users who are near the user U1. In this case, the nearness determiner 113 is able to accumulate determination results, and from them identify periods of time during which the user U1 and the user U2 were near each other, for example. Note that in the present embodiment, the nearness determiner 313 may make a binary determination of whether or not the user U1 and another user are near each other, on the basis of whether or not the above short-range communication is successful. Alternatively, the nearness determiner 313 may make a multi-valued determination of whether the user U1 and another user are near each other by using the measurement results regarding the signal strength and latency during short-range communication, for example.

The contact manager 314, the group manager 315, and the display 316 may be configured similarly to the contact manager 114, the group manager 115, and the display 116 in the foregoing first embodiment.

The SNS manager 317 manages information regarding the SNS used by the user U1. This SNS may be provided by the SNS server 340. For example, when the communication unit 312 transmits a friend relationship query to the terminal devices 330, the SNS manager 317 may provide information included in the query, such as information identifying the SNS and information identifying the user U1. Also, when the communication unit receives a response acknowledging the friend relationship from a terminal device 330, the SNS manager 317 identifies the other user carrying that terminal device 330 (the user U2, for example) from information contained in the response.

(Terminal Device Used by Other User)

A terminal device 330 used by another user includes a communication unit 332 and an SNS manager 333. Note that this functional configuration may be realized using the hardware configuration of an information processing apparatus like that discussed later, for example.

The communication unit 332 communicates with the terminal device 310 by short-range communication, and also communicates with the SNS server 340 using various wired or wireless communication formats. The short-range communication with the terminal device 310 may be wireless communication executed in an ad hoc manner, for example, as discussed above. It is desirable to protect the information transmitted and received by short-range communication by encrypting the information according to a suitable format, for example. Meanwhile, the communication with the SNS server 340 involves the communication unit 332 transmitting a request for information regarding friend relationships on the SNS, and receiving information regarding friend relationships transmitted in response to the request.

The SNS manager 333 manages information regarding the SNS used by the user U2. This SNS may be provided by the SNS server 340. For example, the SNS manager 333 may save information regarding friend relationships on the SNS received by the communication unit 332 as a cache in the storage of the terminal device 330. Also, when the communication unit 332 receives a friend relationship query from the terminal device 310, the SNS manager 333 identifies the user U1 carrying the terminal device 310 from the information contained in the query, and searches for a friend relationship between the user U1 and the user carrying the terminal device 330 (the user U2, for example) on the SNS. If a friend relationship is discovered, the SNS manager 333 provides the communication unit 332 with information identifying the user U2 for inclusion in a response acknowledging the friend relationship.

(SNS Server)

The SNS server 340 includes a friend relationship management DB 342 and a communication unit 343. Note that this functional configuration may be realized using the hardware configuration of an information processing apparatus like that discussed later, for example. This functional configuration may be provided by a single device on a network, but may also be provided by the coordinated operation of multiple devices.

The friend relationship management DB 342 may have a similar configuration as the friend relationship management DB 142 in the foregoing first embodiment. Note that in the present embodiment, the SNS provided by the SNS server 340 is not necessarily requested to provide a position information sharing service, as demonstrated by the lack of a location DB in the SNS server 340.

The communication unit 343 communicates with the terminal device 330 using various wired or wireless communication formats. The communication unit 343 receives a request for information regarding friend relationships from the terminal device 330. The communication unit 343 also transmits friend relationship information acquired from the friend relationship management DB 342 back to the terminal device 330 in response.

In the third embodiment of the present disclosure described above, position information regarding another user is acquired on the basis of the results of M2M communication with the terminal device carried by the user. In so doing, it is possible to utilize information regarding friend relationships on an SNS to recognize other users near the user, and apply that information to how the user's contact list is sorted, even in cases where the particular SNS does not provide a position information sharing service, or where the respective users are not using a position information sharing service, for example.

4. Fourth Embodiment

Example of Acquiring Position Information by Machine-to-Machine Communication and Managing Contacts on Server Next, the fourth embodiment of the present disclosure will be described with reference to FIG. 6. In this embodiment, position information used to sort a contact list is acquired on the basis of M2M communication with the terminal device carried by the user, similarly to the third embodiment above. However, in this embodiment, it is the server that stores the contact list, rather than the terminal device used by the user.
(4-1. Example Process)

Figure 6:
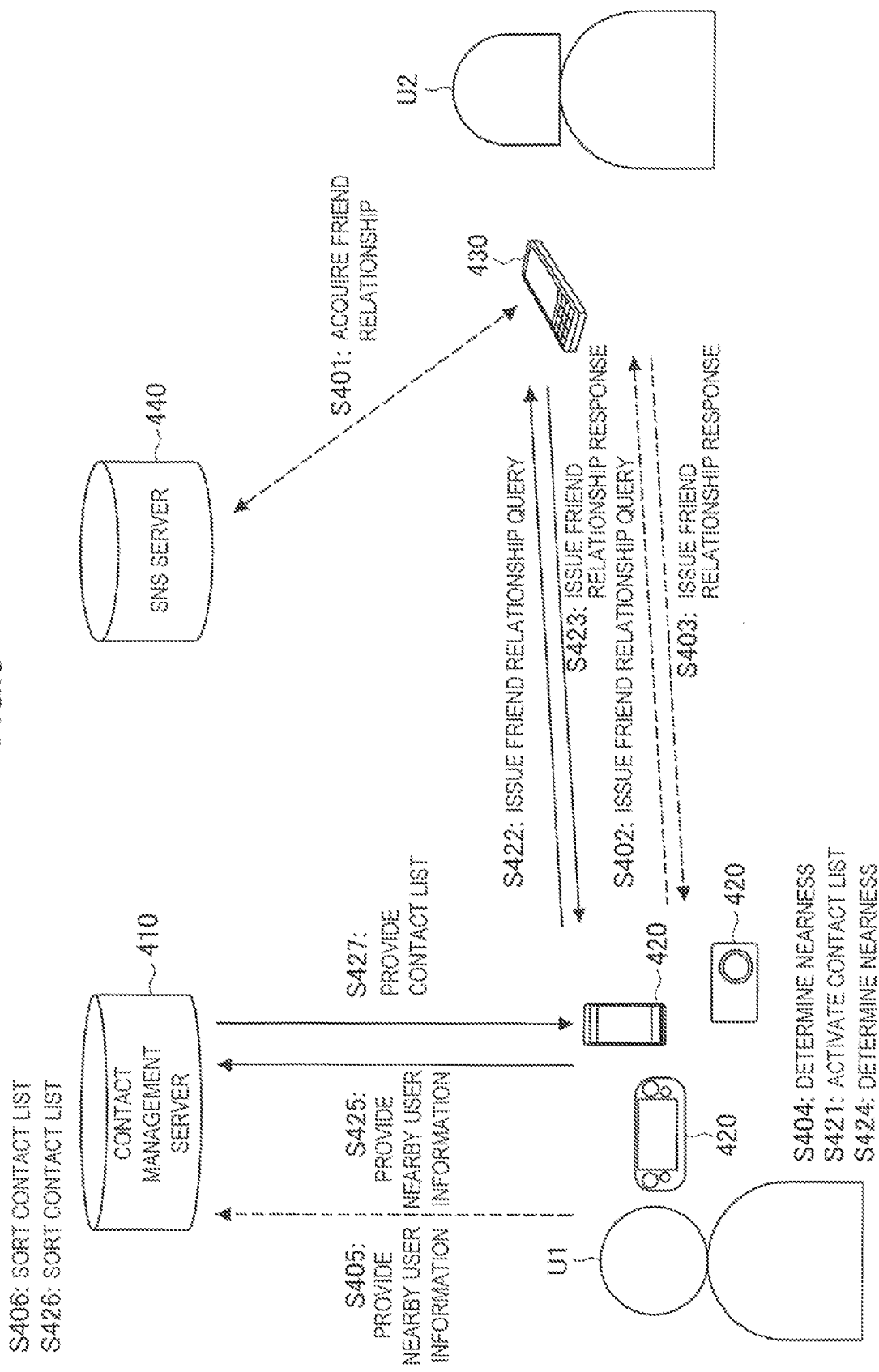
FIG. 6 is a figure that diagrammatically illustrates a process according to a fourth embodiment of the present disclosure.

FIG. 6 is a figure that diagrammatically illustrates a process according to the fourth embodiment of the present disclosure. In the example illustrated in FIG. 6, a user U1 carries multiple terminal devices 420. In addition, a user U2 carries a terminal device 430. The user U1 and the user U2 use an SNS provided by an SNS server 440. Also, the user U1 manages a contact list using a service provided by a contact management server 410. Note that the user U1 and the user U2 exist in a friend relationship on the SNS, and the user U2 is included in the contact list on the contact management server 410.

Note that information regarding the user U2 that is acquired via SNS may not necessarily be automatically associated with information regarding the user U2 that is displayed in a contact list on the contact management server 410. In the example illustrated in FIG. 6, it is assumed that the user U1 has already associated such information together.

The terminal devices 420 may have a similar configuration as the terminal device 310 in the foregoing third embodiment. However, the terminal devices 420 do not include functionality equivalent to the contact manager 314 and the group manager 315. These functions are realized by the contact management server 410.

The terminal device 430 and the SNS server 440 may have configurations respectively similar to the terminal device 330 and the SNS server 340 in the foregoing third embodiment.

The contact management server 410 provides a contact list management service to the terminal devices 420 via a network. The contact management server 410 provides contact list information in response to a request from any of the multiple terminal devices 420. The contact management server 410 acquires information regarding another user near the user U1 (the user U2, for example) from the terminal devices 420, and sorts the user U1's contact list on the basis thereof. For this reason, the contact management server 410 includes functionality equivalent to the contact manager 314 and the group manager 315 of the terminal device 310 in the foregoing third embodiment.

Note that since factors such as the advantages of a contact management server and the relationship between the contact management server 410 and the SNS server 440 are similar to the relationship between the contact management server 210 and the SNS server 240 in the foregoing second embodiment, detailed description thereof is omitted herein.
(Periodic Process)

A first process in this embodiment involves the terminal devices 420 periodically executing short-range communication with the terminal device 430 positioned nearby. The terminal devices 420 identify the user near the user U1 (the user U2, for example) from the results of the short-range communication, and provide that information to the contact management server 410. The contact management server 410 sorts the contact list on the basis of the provided information. The sorting of the contact list executed at this point may involve sorting the contact list according to the time during which the user U2 was near the user U1, or in other words, when and how long the user U1 and the user U2 were together.

In the example illustrated in FIG. 6, first, the terminal device 430 carried by the user U2 acquires information regarding friend relationships from the SNS server 440 (step S401). The terminal device 430 may acquire information regarding friend relationships periodically, or at arbitrary timings in accordance with operations by the user U2, for example.

The information regarding friend relationships acquired in the above step S401 is saved as a cache in the terminal device 430. Since the user U1 and the user U2 exist in a friend relationship on the SNS as discussed earlier, information indicating the friend relationship with the user U1 is saved in the terminal device 430.

Meanwhile, the terminal devices 420 carried by the user U1 transmits a friend relationship query by short-range communication to the terminal device 430 positioned nearby (step S402). The query may be executed by any of the multiple terminal devices 420 being carried by the user U1 at that time. Also, this query is not directed at a specific terminal device 430, but is directed at unspecified terminal devices 430 positioned near the terminal devices 420. Since the contents of the query and its response similar to those described in the foregoing third embodiment, detailed description thereof is omitted herein.

The terminal device 430, having received the query from the terminal devices 420 in the above step S402, transmit a response acknowledging the friend relationship to the terminal devices 420 if the friend relationship between the user U2 and the user U1 on the SNS is recognized (step S403). Since information regarding friend relationships on the SNS was already saved in the terminal device 430 in the above step S401, by referencing this information it is possible to determine whether or not the user U2 and the user U1 exist in a friend relationship. Alternatively, the terminal device 430 may acquire information regarding friend relationships from the SNS server 440 upon receiving a query from a terminal device 420.

The user U1 and the user U2 exist in a friend relationship on the SNS as discussed earlier, and consequently, information indicating the friend relationship between the user U2 and the user U1 is saved in the terminal device 430. Thus, the terminal device 430 transmits a response acknowledging the friend relationship with the user U1 to the terminal devices 420 by short-range communication.

Upon receiving the response from the terminal device 430, the terminal devices 420 utilize the content of the response as position information indicating that the position of the user U2 is near the position of the user U1, and determines that the user U1 and the user U2 are near each other (step S404). The terminal devices 420 transmit information regarding this nearby user to the contact management server 410 (step S405), and the contact management server 410 sorts the contact list on the basis of the received information (step S406), and presents the sorted contact list to the user U1. As discussed earlier, the sorting of the contact list executed at this point may be a sort based on when and how long the user U1 and the user U2 were together. Since specific examples of sorting are similar to those described in the foregoing first embodiment, detailed description thereof is omitted herein.

(Process when Activating Contact List)

A second process in this embodiment is executed when the user U1 issues instructions for activating the contact list, and involves the terminal devices 420 executing short-range communication with the terminal device 430 positioned nearby. The terminal devices 420 identify the user near the user U1 (the user U2, for example) from the results of the short-range communication, and provide that information to the contact management server 410. The contact management server 410 sorts the contact list on the basis of the provided information, and then transmit the sorted contact list to the terminal devices 420, which present the contact list to the user U1. The sorting of the contact list executed at this point may involve sorting the contact list according to whether or not the user U2 is near the user U1 currently, or in other words at the time when the contact list is activated.

In the example illustrated in FIG. 6, first, a terminal device 420 activates the contact list according to instructions from the user U1 (step S421). The activation of the contact list at this point may involve activating application software for presenting a contact list on a terminal device 420. Before issuing a request for contact list data to the contact management server 410, a terminal device 420 executes the following short-range communication sequence.

At this point, the terminal devices 420 transmits a friend relationship query by short-range communication to a terminal device 430 positioned nearby (step S422). This query is not directed at a specific terminal device 430, but is directed at unspecified terminal devices 430 positioned near the terminal devices 420. Since the contents of the query and its response similar to those described in the foregoing third embodiment, detailed description thereof is omitted herein.

The terminal device 430, having received the query from the terminal devices 420 in the above step S422, transmits a response acknowledging the friend relationship to the terminal devices 420 if the friend relationship between the user U2 and the user U1 on the SNS is recognized (step S423). Similarly to the case of the periodic process above, the terminal device 430 transmits a response acknowledging the friend relationship with the user U1 to the terminal devices 420 by short-range communication.

Upon receiving the response from the terminal device 430, the terminal devices 420 utilize the content of the response as position information indicating that the position of the user U2 is near the position of the user U1, and determines that the user U1 and the user U2 are near each other (step S424). The terminal devices 420 transmit information regarding this nearby user to the contact management server 410, together with a request for contact list data (step S425). The contact management server 410 sorts the contact list on the basis of the received information (step S426), and transmits sorted contact list data to the terminal devices 420. In so doing, the contact list is presented to the user on the terminal devices 420 (step S427).

As discussed earlier, the sorting of the contact list executed at this point may be a sort based on whether or not the user U1 and the user U2 are currently near each other. Since specific examples of sorting are similar to those described in the foregoing first embodiment, their description is omitted herein.

Note that although the terminal devices 420 make the determination that the user U1 and the user U2 in the above example, the contact management server 410 or the SNS server 440 may also make this determination. In such cases, information specifying the user U2 that is included in the response received by the terminal devices 420 from the terminal device 430 may be presented to the contact management server 410 or the SNS server 440, for example.

According to the fourth embodiment of the present disclosure described above, position information regarding another user is acquired on the basis of the results of M2M communication with the terminal devices carried by the user. In so doing, it is possible to utilize information regarding friend relationships on an SNS to recognize other users near the user, and apply that information to how the user's contact list is sorted, even in cases where the particular SNS does not provide a position information sharing service, or where the respective users are not using a position information sharing service, for example. Furthermore, by managing the contact list on a server, the user is able to utilize the contact list suitably managed on respective terminal devices, even in cases where the user uses multiple terminal devices for different purposes.

(5. Contact Sorting Examples)

Next, examples of sorting contacts in an embodiment of the present disclosure will be further described with reference to FIGS. 7 to 10. Note that, unless specifically noted otherwise, the examples described hereinafter are also applicable to any of the foregoing first through fourth embodiments.

(5-1. Grouping by Time Periods when Users are Together)

Figure 7:
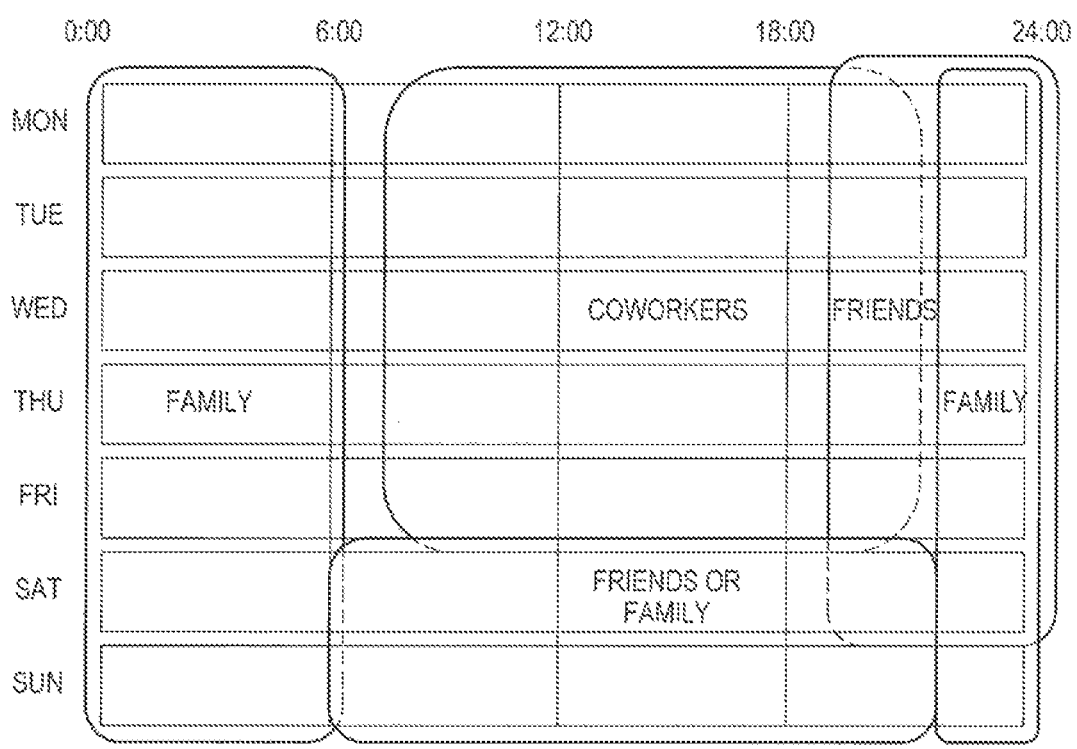
FIG. 7 is a diagram illustrating an example of grouping other users on the basis of time periods spent together with the user according to an embodiment of the present disclosure.

FIG. 7 is a diagram illustrating an example of grouping other users on the basis of time periods when users are together according to an embodiment of the present disclosure. In the example illustrated in FIG. 7, the attributes "family", "coworkers", and "friends" are assigned to groups, but such attributes are not necessarily determined from time periods when users are together. In other words, the groups may also be treated as not having assigned attributes, and may simply be "group A", "group B", and so on, for example. Also, each group does not necessarily contain multiple other users, and respective users may be treated as belonging to individual groups, for example. In this case, the processes described for "groups" hereinafter (including other examples) may also be applied as-is to "other users" individually.

As described in the foregoing embodiments, in an embodiment of the present disclosure, a periodically executed process specifies a period of time when the user (user U1) and another user (user U2) were together, and sorts the contact list on the basis of those results. In the example illustrated in FIG. 7, other users who spend time together with the user are categorized into the same groups in the contact list. For example, other users who are together with the user during a time period every day at night are categorized into the "family" group. Also, other users who are together with the user during a time period on weekdays from morning until evening are categorized into the "coworkers" group. Additionally, other users who are together with the user during a time period on weekdays and Saturday from evening until night are categorized into the "friends" group. Other users who are together with the user during a time period on weekends from morning until evening are categorized into a "friends or family" group.

The time periods used for grouping do not necessarily have a 1-to-1 correspondence with the groups, as demonstrated by the overlap between the time period corresponding to the "friends" group and the time periods corresponding to the "coworkers" and "family" groups, for example. In addition, other users included in the contact list may also be categorized into multiple groups, as demonstrated by the "friends or family" group.

It is also possible to sort the contact list by combining the above such grouping with information on the current time. For example, users belonging to respective groups may be raised to a higher place on the contact list during a time period before the time period corresponding to their respective groups. More specifically, in the case where the current time is in the morning on a weekday, users in the "coworkers" group who are anticipated to be together with the user later that day may be displayed at higher places on the contact list. Also, in the case where the current time is during the day on a weekday, users in the "family" or "friends" group who are anticipated to be together with the user during the later time periods from evening until night may be displayed at higher places on the contact list.

Furthermore, in addition to information on the current time, sorting may also be executed in combination with information regarding another user (user U2) currently together with the user (user U1) that is specified by the process conducted when activating the contact list as described in the foregoing embodiments. For example, in the case where there is a user from among the users in the group corresponding to the current time period who is not together with the user when the contact list is activated, that user may rise to a higher place on the contact list. More specifically, in the case where a user in the "family" group (taken to be a user A) is not together with the user, user A may be displayed at a higher place on the contact list, regardless of whether the current time is during the weekend. Also, in the case where a user in the "coworkers" group (taken to be a user B) is not together with the user, user B may be displayed at a higher place on the contact list, even though the current time may be during the day on a weekday.

(5-2. Grouping by Places where Users are Together)

Figure 8:
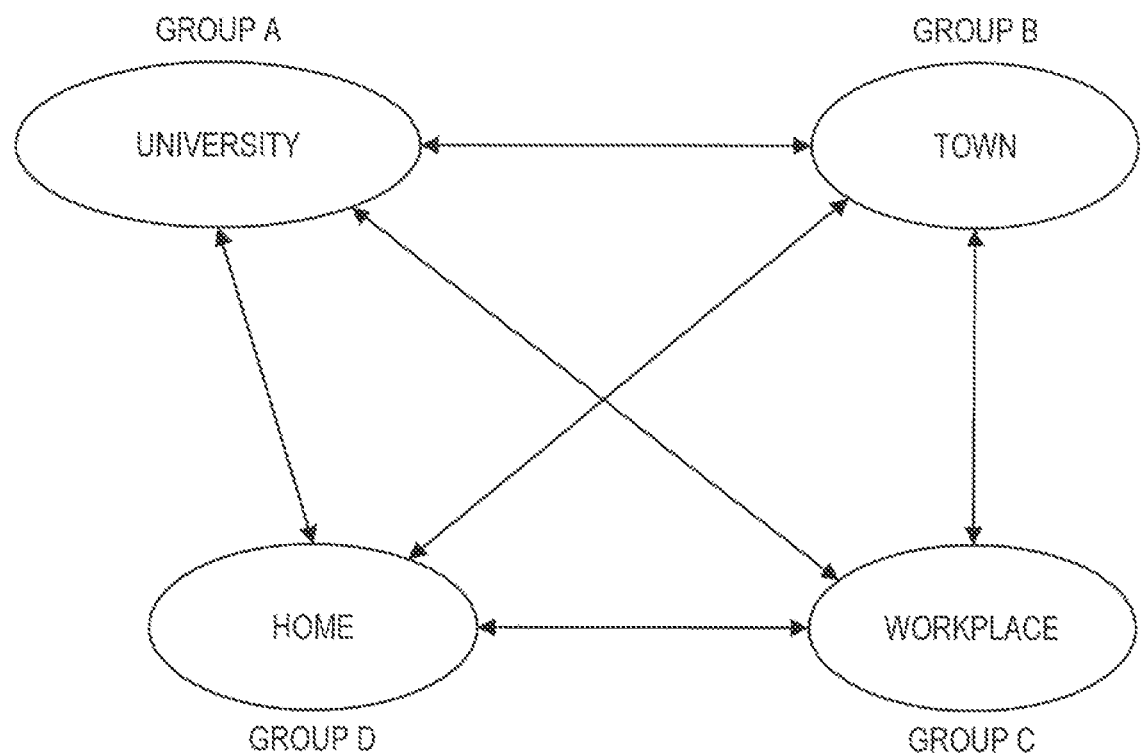
FIG. 8 is a diagram illustrating an example of grouping other users on the basis of places where the other users were together with the user according to an embodiment of the present disclosure.

FIG. 8 is a diagram illustrating an example of grouping other users on the basis of places where the other users were together with the user according to an embodiment of the present disclosure. Similarly to the above example, it is not necessary to assign attributes to the groups. Also, each group does not necessarily contain multiple other users, and respective users may be treated as belonging to individual groups.

In the foregoing first and second embodiments, since respective position information regarding the user (user U1) and another user (user U2) is acquired, it is possible to identify times when the users were together, while additionally identifying places where the users were together. In the third and fourth embodiments, since information indicating whether or not the user (user U1) and another user (user U2) are near each other is acquired, in some cases the place where the users were together may not be identified. However, if an additional process is added, such as a process of the terminal device carried by the user (user U1) acquiring and registering its own position information when determining nearness, it is possible to identify places where the user and another user were together.

In the example illustrated in FIG. 8, when it is determined that the user (user U1) and another user (user U2) were together by the periodically executed process and/or the process executed when activating the contact list as described in the foregoing embodiments, the positions of the user and the other user when together are accumulated, and other users having the same accumulated positions are categorized into the same groups in the contact list. For example, group A is a group of other users who were together with the user at a place labeled "university" (potentially university classmates). Group B is a group of other users who were together with the user at a place labeled "town" (potentially friends who socialize with the user). Group C is a group of other users who were together with the user at a place labeled "workplace" (potentially coworkers at a part-time job). Group D is a group of other users who were together with the user at a place labeled "home" (potentially family members).

By grouping other users in the contact list according to place in this way, it is possible to present a suitably sorted contact list even to a user who does not keep a regular daily schedule, for example.

When grouping as described above, it is possible to sort the contact list more effectively if patterns in which user moves from place to place are recognized, for example. For example, if it is inferred according to a pattern that the user will move to a given place next, the other users belonging to the group corresponding to that place may rise to a higher place on the contact list. More specifically, assume that a movement pattern from "home", to "university", to "town" or "workplace", to "home" has been recognized. In this case, if the user's current position is at "home", it may be inferred that the user will move to "university" next, and the users in the corresponding group A may be displayed at higher places on the contact list. In addition, if the user's current position is at "workplace", it may be inferred that the user will move to "home" next, and the users in the corresponding group D may be displayed at higher places on the contact list.

Furthermore, in addition to information on the current position, sorting may also be executed in combination with information regarding another user (user U2) currently together with the user (user U1) that is specified by the process conducted when activating the contact list as described in the foregoing embodiments. For example, in the case where there is a user from among the users in the group corresponding to the current position who is not together with the user when the contact list is activated, that user may rise to a higher place on the contact list. More specifically, in the case where a user in group A (taken to be a user C) is not together with the user, user C may be displayed at a higher place on the contact list, even though the current place may be "university". In addition, in the case where a user in group B (taken to be a user D) is not together with the user, user D may be displayed at a higher place on the contact list, even though the current place may be "town".

(5-3. Other Examples)
(Switching Between Group Display and Other Sort Functionality)

Figure 9:
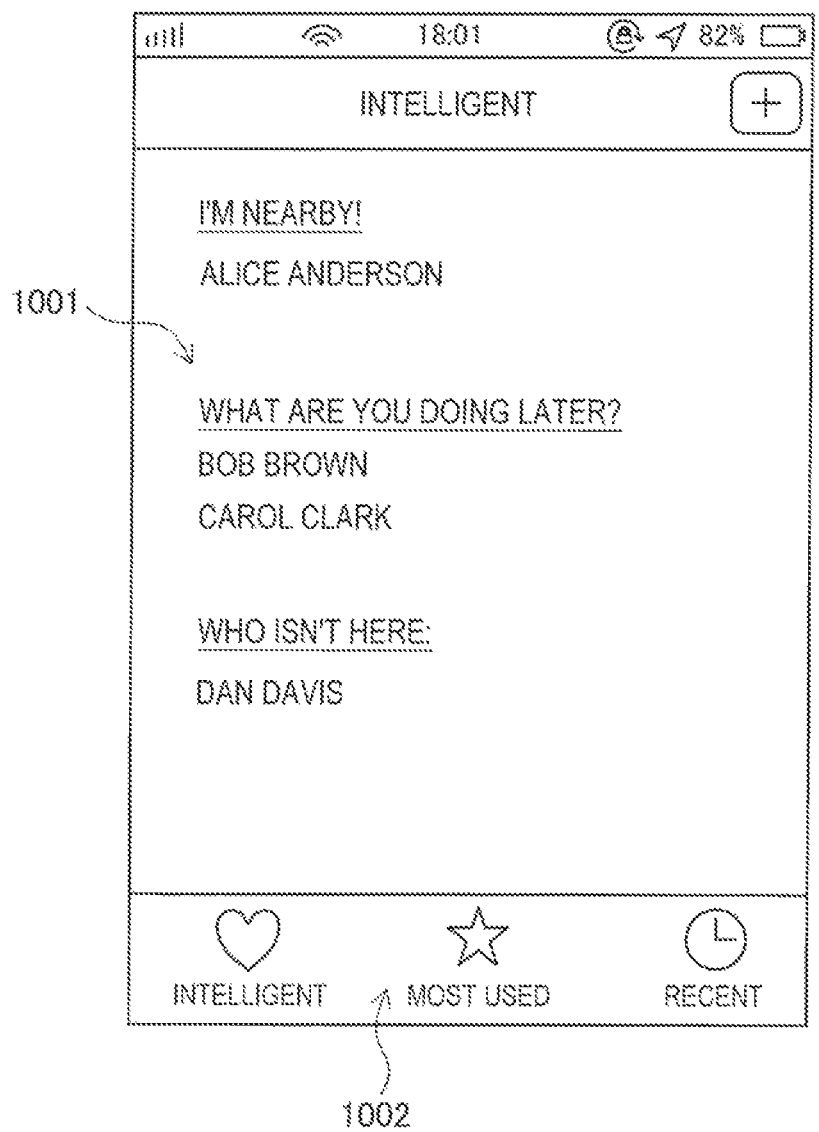
FIG. 9 is a diagram illustrating a first example of a contact list sorted according to an embodiment of the present disclosure.

FIG. 9 is a diagram illustrating a first example of a contact list sorted according to an embodiment of the present disclosure.

In the example illustrated in FIG. 9, a grouped display 1001 is displayed for individual sort factors. The grouped display 1001 indicates three groups. The group labeled "I'm nearby!" is displayed in the case where another, infrequently contacted user is coincidentally nearby. As discussed earlier, in the case of making a multi-valued determination regarding whether or not users are nearby, it is possible to identify users who are nearby, but not together with, the user. A given threshold value for the distance between users, for example, may be set for the multi-valued nearness determination. If the user and another user are near each other at a distance equal to or greater than the given threshold value, that other user rises to a higher place on the contact list as a user who is coincidentally nearby. Meanwhile, if the user and another user are near each other at a distance less than the given threshold value, that other user falls to a lower place on the contact list as a user who is already together with the user. Note that displaying such groups involves working in conjunction with the communication functionality of the terminal device to acquire a communication history between the user and the other user. In this way, the contact list sorting functionality described in the foregoing embodiments may be used in combination with existing contact list sorting functionality, such as sorting functionality that uses a communication history, for example.

In addition, the group labeled "What are you doing later?" may be the group of other users who are inferred to be together with the user in the time period after the current time period (evening), as described with the example in FIG. 7. Alternatively, this group may be the group of other users who are inferred to be together with the user at a place where the user is inferred to move to next from the current position, as described with the example in FIG. 8.

On the other hand, the group labeled "Who isn't here:" may be users who are inferred to be together with the user in the current time period (evening) as described with the example in FIG. 7, but who are not actually together with the user. Alternatively, this group may be other users who are inferred to be together with the user at a place where the user is inferred to go next from the current position as described with the example in FIG. 8, but who are not actually together with the user.

In this way, users who are nearby but not together with the user, users who are expected to be together with the user later (but not currently together with the user), and users who are expected to be together with the user currently but actually are not are displayed on the grouped display 1001 in the example illustrated in FIG. 9. In other words, other users who are currently together with the user are not displayed on the grouped display 1001. This is a result of inferring that there is no need to display users currently together with the user on the contact list because the user will not have to contact such users using communication technology. If this inference is followed, another user (user U2) determined to be currently together with the user (user U1) is assigned a lower place on the contact list in the process conducted when activating the contact list as described in the foregoing embodiments. Alternatively, the user U2 may be temporarily hidden from the contact list.

Also, although the foregoing describes an example of sorting a contact list by groups, the order of multiple users displayed within a group may be similarly sorted. For example, another user who has been together with the user for a longer time thus far may be assigned a higher place in the same group as a user who is closer to the user.

In addition, a switching UI 1002 is displayed in the footer of the grouped display 1001. "Intelligent" is the sort based on user being together which is displayed as the grouped display 1001. Meanwhile, "Most Used" and "Recent" may be sorts based on existing contact list sorting functionality, such as sorting functionality that uses a communication history, for example. In this way, it is possible to use the contact list sorting functionality according to an embodiment of the present disclosure by switching between that functionality and existing contact list sorting functionality.

Alternatively, in the case where there are few other users sortable by the contact list sorting functionality according to an embodiment of the present disclosure, for example, a group may be generated by applying the contact list sorting functionality according to an embodiment of the present disclosure limited to those users, while all other users may be categorized into existing groups, such as groups set by user input or groups imported from an SNS, for example.

In this case, it may also be possible for the user to add users to groups generated by the contact list sorting functionality according to an embodiment of the present disclosure, even users who are not subjected to the contact list sorting functionality according to an embodiment of the present disclosure because those user are not sharing position information, for example. For example, it may also be possible for the user to add a user who is not sharing position information, labeled "father", to the "family" group generated in the above example from FIG. 7. In this case, although the contact list is not sorted to reflect whether or not "father" is together with the user, "father" may still be sorted as a member of the "family" group together with the other group members in the case where the "family" group as a whole moves to a different place on the contact list on the basis of the current time or the user's current position, for example.

(Merging Group Display and Other Sort Functionality)

Figure 10:
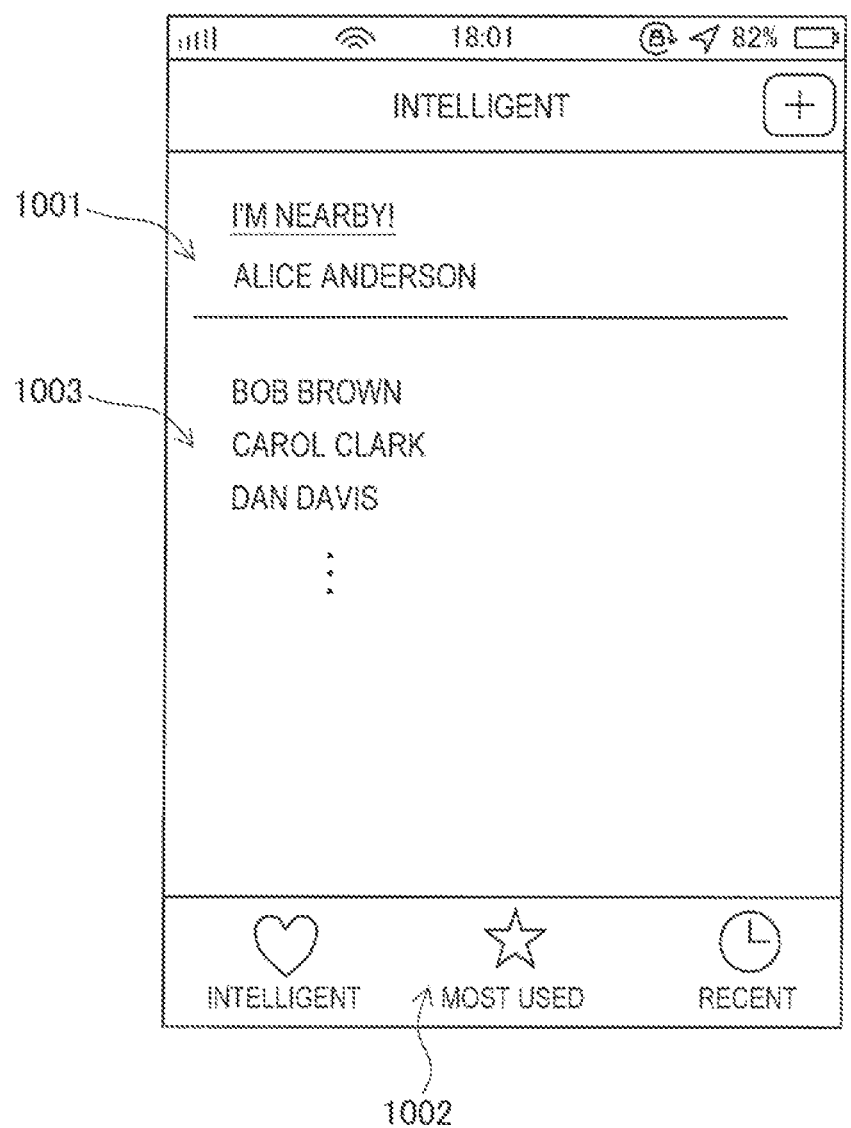
FIG. 10 is a diagram illustrating a second example of a contact list sorted according to an embodiment of the present disclosure.

FIG. 10 is a diagram illustrating a second example of a contact list sorted according to an embodiment of the present disclosure.

In the example illustrated in FIG. 10, a merged display 1003 is displayed together with the grouped display 1001 described above. In the merged display 1003, the other users included on the contact list are sorted and arranged using both the contact list sorting functionality according to an embodiment of the present disclosure, and existing contact list sorting functionality.

The contact list sorting functionality according to an embodiment of the present disclosure provides an easier-to-use contact list on the basis of users being together. However, such functionality presumes that position information regarding the other users will be provided, and that the short-range communication functionality of terminal devices will be used. Consequently, this sorting functionality may not necessarily be applied to all users included on the contact list. Consequently, it is desirable to combine the contact list sorting functionality according to an embodiment of the present disclosure with existing contact list sorting functionality, as described above.

Additionally, sorting the contact list on the basis of users being together may not necessarily reflect all of the user's desires. For example, with the above sort functionality, it is difficult to sort someone whom the user contacts frequently but does not actually meet (since that person is sorted higher than persons whom the user actually meets). Consequently, from this additional perspective it is likewise desirable to use the contact list sorting functionality according to an embodiment of the present disclosure in combination with existing contact list sorting functionality.

Obviously, it is possible to apply the contact list sorting functionality according to an embodiment of the present disclosure to other users included on the contact list, and it is also possible to use the contact list sorting functionality according to an embodiment of the present disclosure in cases where the user's desires are sufficiently reflected on the basis of users being together.

(Generation of Limited-Time Groups)

As another example, it is also possible to generate limited-time groups using the contact list sorting functionality according to an embodiment of the present disclosure. For example, there may be cases where the user wants to sort a group of specific users higher on the contact list for a specific, limited time, such as when banding with friends to go touring, or when taking a drive with several cars.

For such cases, functionality for generating a group from the other users currently together with the user (impromptu group generation) and for raising the sorting priority of a group for a limited time may be prepared, for example. With impromptu group generation, an impromptu group may be generated by a user operation that increases the "time spent together" weight given to other users who are together with the user during a specific time period (such as currently). (For example, if the weight is set to 60×, another user who has been together with the user for 10 minutes will be rated equally to another user who has been together with the user for 10 hours.) Alternatively, other users who are together with the user when performing the user operation may be specified, and those users may be categorized directly into an impromptu group, similarly to the sorting conducted when activating the contact list as described earlier.

Specifically, at a moment when the other users to be set as part of an impromptu group (the group members) have assembled, the user may create a new group from the members currently together with the user, for example. A user operation may also set how long to raise the sort priority (also potentially referred to as the period of validity) for that group. Note that the period of validity is not limited to starting from the time of group creation (for example, a future scheduled date for the touring or drive may be set). During this period, members in the above group are recognized as other users with a potentially high contact priority. Consequently, during the later touring or drive, a group member who has separated from the user (in other words, is no longer recognized as being together with the user) is sorted higher on the user's contact list.

It may also be possible for the user to share an impromptu group set in this way with other group members using the same contact list management service, for example. Information such as the above period of validity may also be shared at this point. Also, the group may automatically dissolve when the period of validity set by a user operation when creating the group has elapsed, for example.

(6. Hardware Configuration)

Figure 11:
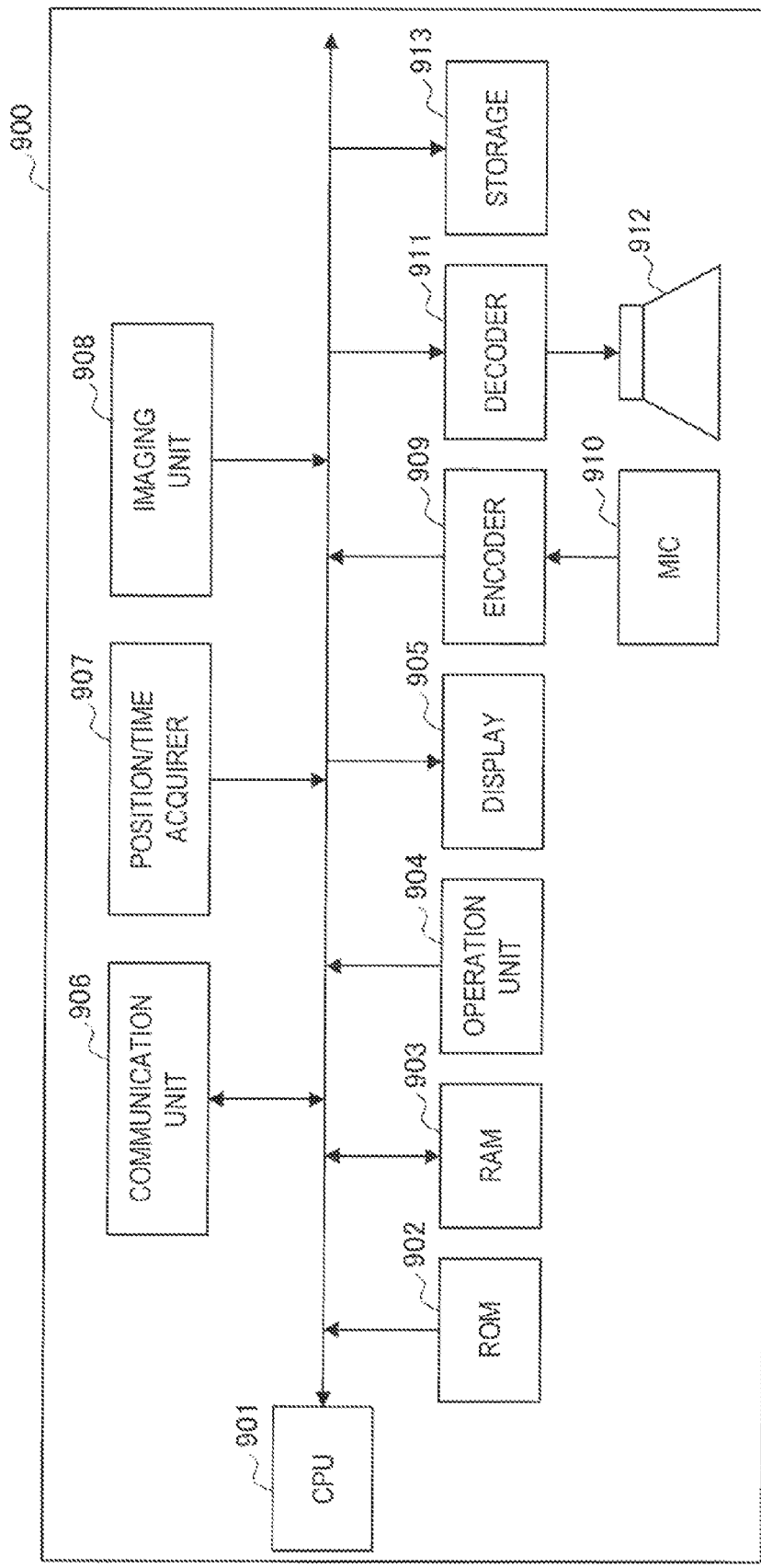
FIG. 11 is a block diagram for describing a hardware configuration of an information processing apparatus.

Lastly, a hardware configuration of an image processing apparatus according to an embodiment of the present disclosure will be described with reference to FIG. 11. FIG. 11 is a block diagram for describing a hardware configuration of an information processing apparatus. As described in the foregoing embodiments, the information processing apparatus 900 may realize the terminal devices 110, 130, 220, 230, 310, 330, 420, and 430, the SNS servers 140, 240, 340, and 440, and the contact management servers 210 and 410.

The information processing apparatus 900 generally executes telephony or various data communication with external devices. The information processing apparatus 900 may also include functionality for taking pictures and recording audio, for example.

In the information processing apparatus 900 a controller made up of a central processing unit (CPU) 901, read-only memory (ROM) 902, and random access memory (RAM) 903 centrally controls the apparatus overall. The controller and the respective components are connected via a bus. The CPU 901 realizes various processing functionality by retrieving a program stored in the ROM 902 or storage 913, and executing the program while using the RAM 903 as a work area.

An operation unit 904 includes a touch panel and various operable buttons such as directional buttons and an OK button for operating a graphical user interface (GUI) menu, for example. The operation unit 904 accepts instructions and commands corresponding to pressing operations performed by the user on the operable buttons and the touch panel, and delivers the instructions and commands to the controller via the bus. The controller executes various processes according to the instructions and commands.

The communication unit 906 communicates with external devices using various wired or wireless communication formats. Communication with an external device may include the audio telephony described below, and the exchange of information with an external device such as the servers described in the foregoing embodiments, for example.

When the information processing apparatus 900 executes audio telephony, the communication unit 906 demodulates a receive signal according to a given format to convert the receive signal into receive data, which is delivered to a decoder 911. The decoder 911 reconstructs the telephony audio data of the other party by decoding the receive data under control by the controller, and outputs the reconstructed telephony audio data to a speaker 912. The speaker 912 outputs telephony audio of the other party on the basis of the telephony audio data. Meanwhile, the information processing apparatus 900 delivers an audio signal picked up by a microphone 910 to an encoder 909. Under control by the controller, the encoder 909 digitally converts the audio signal and then encodes the result according to a given format, and delivers the audio data obtained as a result to the communication unit 906.

Also, in the case where a user operation selects the audio recording functionality, the information processing apparatus 900 stores an audio signal picked up by the microphone 910 as audio data via the encoder 909 in storage 913 made up of non-volatile memory, for example.

A position/time acquirer 907 is provided in the case where the information processing apparatus 900 includes functionality for acquiring its own position information. The position/time acquirer 907 computes position information indicating the current position and time information indicating the current time on the basis of positioning information (a GPS signal, for example) received from positioning technology such as Global Positioning System (GPS) satellites, and collectively delivers the results to the controller as position/time information. The position/time acquirer 907 may also acquire position information by positioning using a Wireless Fidelity (Wi-Fi®) access point, or by positioning using a mobile base station.

An imaging unit 908 is provided in the case where the information processing apparatus 900 includes imaging functionality. The imaging unit 908 is made up of a camera, and takes still images or moving images according to user operations. The imaging unit 908 causes photographic data obtained by imaging a subject to be displayed by being output to a display 905 in the case of taking a still image, while displaying moving image data obtained by imaging a subject on the display 905 in the case of taking a moving image.

The display 905 displays various information for the user under control by the controller. The displayed information may include contact list information, for example. The display 905 may also display contact list sorting, and a GUI for setting contact list sorting functionality.

The storage 913 temporarily or permanently stores various information related to processes by the information processing apparatus 900. The storage 913 may be semiconductor memory such as flash read-only memory (ROM), an optical disc such as a Compact Disc (CD), or a hard disk drive (HDD), for example. The storage 913 may be a storage device built into the information processing apparatus 900, but may also be a removable medium such as a memory card that may be freely inserted into the information processing apparatus 900. The storage 913 may also include multiple types of storage devices or removable media.

(7. Supplemental Remarks)

The foregoing thus describes preferred embodiments of the present disclosure in detail and with reference to the attached drawings. However, the technical scope of the present disclosure is not limited to such examples. It should be clear to persons ordinarily skilled in the technical field of the present disclosure that various modifications or alterations may occur insofar as they are within the scope of the technical ideas stated in the claims, and it should be understood that such modifications or alterations obviously belong to the technical scope of the present disclosure.

For example, although the foregoing description describes embodiments that include an SNS server for defining friend relationships between users, an embodiment of the present disclosure is not limited thereto. For example, a service that manages the user's friends and the terminal devices used by those friends in association with each other may also be provided on a network. In this case, it is possible for the user to use the above service to identify whether or not the user of another terminal device identified by M2M communication is a friend, for example, and apply those results to how the contact list is sorted.

Also, in the above example, information associating friends and terminal devices may be managed by the terminal device used by the user. In this case, it is possible for the terminal device used by the user to identify whether or not the user of another terminal device identified by M2M communication is a friend, for example, without accessing a server on a network. In this case, an embodiment of the present disclosure may be realized by just the terminal devices respectively used by the user and another user, or in other words, without a server on a network.

Embodiments of the present disclosure encompass an information processing apparatus as described in the foregoing, an information processing system, an information processing method, a program for causing a computer to function as an information processing apparatus, and a recording medium storing such a program, for example.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
a positional relationship information acquirer that acquires information indicating a position relationship between a first user and a second user;
a nearness determiner that determines whether or not the first user and the second user are near each other, on the basis of the information indicating the position relationship; and
a contact manager that sorts, on the basis of a result of the determination, a contact list which is provided to the first user and which includes contact information for the second user.

(2) The information processing apparatus according to (1), wherein
the positional relationship information acquirer acquires first position information indicating a position of the first user, and second position information indicating a position of the second user, and
the nearness determiner determines whether or not the first user and the second user are near each other on the basis of a distance between the position of the first user and the position of the second user.

(3) The information processing apparatus according to (2), wherein
the positional relationship information acquirer includes a communication unit that acquires at least one of the first position information and the second position information from a position information sharing service on a network.

(4) The information processing apparatus according to (1), wherein
the positional relationship information acquirer acquires a result of short-range communication between a first terminal device carried by the first user and a second terminal device carried by the second user, and
the nearness determiner determines whether or not the first user and the second user are near each other on the basis of the result of the short-range communication.

(5) The information processing apparatus according to (4), wherein
the positional relationship information acquirer acquires a response from the second terminal device in response to a query transmitted from the first terminal device, and
the nearness determiner determines that the first user and the second are near each other in a case of acquiring the response.

(6) The information processing apparatus according to (5), wherein
the query contains information identifying the first user on a social networking service, and
the response is transmitted from the second terminal device in the case where the query is received by the second terminal device, and the first user and the second user exist in a friend relationship on the social networking service.

(7) The information processing apparatus according to any one of (1) to (6), wherein
the nearness determiner periodically determines whether or not the first user and the second user are near each other.

(8) The information processing apparatus according to (7), wherein
the contact manager sorts the contact list in a manner that the second user is raised to a higher place in a case where the first user and the second user have been near each other for a longer time on the basis of a of the periodic determination.

(9) The information processing apparatus according to (8), wherein
the contact manager, obeying settings set by the first user, changes weighting of a time during which the first user and the second user have been near each other on a per-time-period basis.
(10) The information processing apparatus according to any one of (7) to (9), wherein
the contact manager estimates a time period when the first user and the second user are near each other on the basis of the result of the periodic determination, and sorts the contact list in a manner that the second user is raised to a higher place in a case where a current time is in a time period prior to the estimated time period.
(11) The information processing apparatus according to any one of (7) to (10), further including:
a group manager that estimates a time period when the first user and the second user are near each other on the basis of the result of the periodic determination, and categorizes the second user who is near the first user during a shared first time period into a first group on the contact list.
(12) The information processing apparatus according to (11), wherein
the nearness determiner determines whether or not the first user and the second user are near each other when the contact list is provided to the first user, and
the contact manager sorts the contact list in a manner that the second user is raised to a higher place in a case where a time during which the contact list is provided to the first user is referred to as the first time period, and the second user categorized into the first group is not near the first user.
(13) The information processing apparatus according to any one of (7) to (12), further including:
a group manager that estimates a place where the first user and the second user are near each other on the basis of the result of the periodic determination, and categorizes the second user who is near the first user at a shared second place into a second group on the contact list.
(14) The information processing apparatus according to any one of (7) to (13), further including:
a group manager that categorizes the second user into a group on the contact list on the basis of the result of the periodic determination, and categorizes a user other than the second user who has contact information included on the contact list into the group in accordance with an operation by the first user.
(15) The information processing apparatus according to any one of (1) to (14), wherein
the nearness determiner determines whether or not the first user and the second user are near each other when the contact list is provided to the first user.
(16) The information processing apparatus according to (15), wherein
the contact manager sorts the contact list in a manner that the second user is dropped to a lower place or the second user is not displayed in a case where the first user and the second user are near each other when the contact list is provided to the first user.
(17) The information processing apparatus according to (15) or (16), wherein the nearness determiner determines whether the first user and the second user are near each other by a distance equal to or greater than a first distance, or by a distance less than the first distance, and the contact manager sorts the contact list in a manner that the second user is raised to a higher place in a case where the first user and the second user are near each other by the distance equal to or greater than the first distance, and sorts the contact list in a manner that the second user is dropped to a lower place or the second user is not displayed in a case where the first user and the second user are near each other by the distance less than the first distance.
(18) The information processing apparatus according to (15), further including:
a group manager that categorizes the second user, who is near the first user on the basis of the result of the determination, into a first group on the contact list.
(19) An information processing method including: acquiring information indicating a position relationship between a first user and a second user;
determining whether or not the first user and the second user are near each other, on the basis of the information indicating the position relationship; and sorting, on the basis of a result of the determination, a contact list which is provided to the first user and which includes contact information for the second user.
(20) A computer-readable recording medium having a program recorded thereon, the program causing a computer to execute the functions of:
acquiring information indicating a position relationship between a first user and a second user;
determining whether or not the first user and the second user are near each other, on the basis of the information indicating the position relationship; and
sorting, on the basis of a result of the determination, a contact list which is provided to the first user and which includes contact information for the second user.

The present disclosure contains subject matter related to that disclosed in Japanese Priority Patent Application JP 2012-115615 filed in the Japan Patent Office on May 21, 2012, the entire content of which is hereby incorporated by reference.

What is claimed is:
1. An information processing apparatus comprising:
a positional relationship information acquirer that acquires information indicating a position relationship between a first user and a second user;
a nearness determiner that determines whether or not the first user and the second user are near each other, on the basis of the information indicating the position relationship; and
a contact manager that estimates, as a duration of time, a time period when the first user and the second user are near each other, and that sorts, on the basis of a result of the determination and on the basis of a result of the estimation, a contact list which is provided to the first user and which includes contact information for the second user,
wherein the sorted contact list is modified to exclude the contact information for the second user from the contact list, or to reduce a placement priority position of the contact information for the second user within the contact list, when the first user and the second user are determined to be together at a same location.
2. The information processing apparatus according to claim 1, wherein
the positional relationship information acquirer acquires first position information indicating a position of the first user, and second position information indicating a position of the second user, and the nearness determiner determines whether or not the first user and the second user are near each other on the basis of a distance between the position of the first user and the position of the second user.

3. The information processing apparatus according to claim 2, wherein
the positional relationship information acquirer includes a communication unit that acquires at least one of the first position information and the second position information from a position information sharing service on a network.

4. The information processing apparatus according to claim 1, wherein
the positional relationship information acquirer acquires a result of a short-range communication of data between a first terminal device carried by the first user and a second terminal device carried by the second user, and
the nearness determiner determines whether or not the first user and the second user are near each other on the basis of the result of the short-range communication of the data.

5. The information processing apparatus according to claim 4, wherein
the positional relationship information acquirer is further configured to acquire a response from the second terminal device that is transmitted from the second terminal device in response to a query transmitted from the first terminal device, and
the nearness determiner determines that the first user and the second are near each other upon the positional relationship information acquirer acquiring the response.

6. The information processing apparatus according to claim 5, wherein
the query contains information identifying the first user on a social networking service, and
the response is transmitted from the second terminal device in the case where the query is received by the second terminal device, and the first user and the second user exist in a friend relationship on the social networking service.

7. The information processing apparatus according to claim 1, wherein
the nearness determiner periodically determines whether or not the first user and the second user are near each other.

8. The information processing apparatus according to claim 7, wherein
the contact manager sorts the contact list in a manner that the second user is raised to a higher place in a case where the first user and the second user have been near each other for a longer time on the basis of the periodic determination, as compared to a case where the first user and the second user have been near each other for a shorter time on the basis of the periodic determination.

9. The information processing apparatus according to claim 8, wherein
the contact manager, obeying settings set by the first user, changes weighting of a time during which the first user and the second user have been near each other on a per-time-period basis.

10. The information processing apparatus according to claim 7, wherein
the contact manager estimates the time period when the first user and the second user are near each other on the basis of the result of the periodic determination, and sorts the contact list in a manner that the second user is raised to a higher place in a case where a current time is in a time period prior to the estimated time period.

11. The information processing apparatus according to claim 7, further comprising:
a group manager that estimates the time period when the first user and the second user are near each other on the basis of the result of the periodic determination, and categorizes the second user who is near the first user during a shared first time period into a first group on the contact list.

12. The information processing apparatus according to claim 11, wherein
the nearness determiner makes the determination when the contact list is provided to the first user, and
the contact manager sorts the contact list in a manner that the second user is raised to a higher place in a case where a time during which the contact list is provided to the first user is referred to as the first time period, and the second user categorized into the first group is not near the first user.

13. The information processing apparatus according to claim 7, further comprising:
a group manager that estimates a place where the first user and the second user are near each other on the basis of the result of the periodic determination, and categorizes the second user who is near the first user at a shared second place into a second group on the contact list.

14. The information processing apparatus according to claim 7, further comprising:
a group manager that categorizes the second user into a group on the contact list on the basis of the result of the periodic determination, and categorizes a user other than the second user who has contact information included on the contact list into the group in accordance with an operation by the first user.

15. The information processing apparatus according to claim 1, wherein the nearness determiner determines whether or not the first user and the second user are near each other when the contact list is provided to the first user.

16. The information processing apparatus according to claim 15, wherein the contact manager sorts the contact list in a manner that the second user is dropped to a lower place or the second user is not displayed in a case where the first user and the second user are near each other when the contact list is provided to the first user.

17. The information processing apparatus according to claim 15, wherein
the nearness determiner determines whether the first user and the second user are near each other by a distance equal to or greater than a first distance, or by a distance less than the first distance, and
the contact manager sorts the contact list in a manner that the second user is raised to a higher place in a case where the first user and the second user are near each other by the distance equal to or greater than the first distance, and sorts the contact list in a manner that the second user is dropped to a lower place or the second user is not displayed in a case where the first user and the second user are near each other by the distance less than the first distance.

18. The information processing apparatus according to claim 15, further comprising:
a group manager that categorizes the second user, who is near the first user on the basis of the result of the determination, into a first group on the contact list.

19. An information processing method executed by at least one processor, the method comprising:

acquiring information indicating a position relationship between a first user and a second user;

determining whether or not the first user and the second user are near each other, on the basis of the information indicating the position relationship;

estimating, as a duration of time, a time period when the first user and the second user are near each other; and sorting, on the basis of a result of the determination and on the basis of a result of the estimation, a contact list which is provided to the first user and which includes contact information for the second user, wherein the sorted contact list is modified to exclude the contact information for the second user from the contact list, or to reduce a placement priority position of the contact information for the second user within the contact list, when the first user and the second user are determined to be together at a same location.

20. A non-transitory computer-readable recording medium having a program recorded thereon, the program causing a computer to execute the functions of:

acquiring information indicating a position relationship between a first user and a second user;

determining whether or not the first user and the second user are near each other, on the basis of the information indicating the position relationship; and estimating, as a duration of time, a time period when the first user and the second user are near each other; and sorting, on the basis of a result of the determination and on the basis of a result of the estimation, a contact list which is provided to the first user and which includes contact information for the second user, wherein the sorted contact list is modified to exclude the contact information for the second user from the contact list, or to reduce a placement priority position of the contact information for the second user within the contact list, when the first user and the second user are determined to be together at a same location.

* * * * *